United States Patent
Lee et al.

(10) Patent No.: US 12,309,814 B2
(45) Date of Patent: May 20, 2025

(54) METHOD AND DEVICE FOR PERFORMING CONGESTION CONTROL IN NR V2X

(71) Applicant: LG Electronics Inc., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 381 days.

(21) Appl. No.: 17/778,183

(22) PCT Filed: Nov. 20, 2020

(86) PCT No.: PCT/KR2020/016449
§ 371 (c)(1),
(2) Date: May 19, 2022

(87) PCT Pub. No.: WO2021/101305
PCT Pub. Date: May 27, 2021

(65) Prior Publication Data
US 2023/0007670 A1 Jan. 5, 2023

Related U.S. Application Data

(60) Provisional application No. 62/938,296, filed on Nov. 20, 2019, provisional application No. 62/938,937, (Continued)

(30) Foreign Application Priority Data

Nov. 26, 2019 (KR) .................. 10-2019-0153820
Nov. 27, 2019 (KR) .................. 10-2019-0154903

(51) Int. Cl.
*H04W 72/52* (2023.01)
*H04L 27/26* (2006.01)
(Continued)

(52) U.S. Cl.
CPC ....... *H04W 72/52* (2023.01); *H04L 27/26025* (2021.01); *H04W 28/0284* (2013.01); *H04W 72/0446* (2013.01); *H04W 72/20* (2023.01)

(58) Field of Classification Search
CPC ............. H04W 72/52; H04W 28/0284; H04W 72/0446; H04W 72/20; H04W 4/025;
(Continued)

(56) References Cited

U.S. PATENT DOCUMENTS

2019/0174466 A1* 6/2019 Zhang .................. H04L 5/0057
2019/0253958 A1* 8/2019 Lee ....................... H04W 76/15
(Continued)

FOREIGN PATENT DOCUMENTS

KR  1020190123787  11/2019

OTHER PUBLICATIONS

Vivo, QoS management for sidelink, R1-1912027, 3GPP TSG RAN WG1 Meeting #99, Reno, USA, Nov. 8, 2019, see section 2.1.
(Continued)

*Primary Examiner* — Kan Yuen
(74) *Attorney, Agent, or Firm* — BRYAN CAVE LEIGHTON PAISNER LLP

(57) ABSTRACT

A method for performing wireless communication by a first apparatus and an apparatus for supporting same are provided. The method may comprise: measuring, in a first slot, a channel busy ratio (CBR) for a resource pool; determining power for physical sidelink shared channel (PSSCH) transmission in a second slot, based on the CBR measured in the first slot; and performing, to a second device, the PSSCH transmission in the second slot based on the power, wherein the first slot is a slot before N slots from the second slot, wherein the N is determined based on subcarrier spacing (SCS) related to the PSSCH transmission, and wherein the N is a positive integer.

20 Claims, 25 Drawing Sheets

Related U.S. Application Data filed on Nov. 21, 2019, provisional application No. 62/938,899, filed on Nov. 21, 2019, provisional application No. 62/940,876, filed on Nov. 26, 2019.

(51) Int. Cl.
*H04W 28/02* (2009.01)
*H04W 72/0446* (2023.01)
*H04W 72/20* (2023.01)

(58) Field of Classification Search
CPC ............ H04W 52/243; H04W 52/343; H04W 52/383; H04W 4/08; H04W 4/40; H04W 28/0289; H04W 72/0473; H04W 72/23; H04L 27/26025; H04L 1/1887; H04L 5/0007

See application file for complete search history.

(56) References Cited

U.S. PATENT DOCUMENTS

| | | | |
|---|---|---|---|
| 2019/0342910 A1 | 11/2019 | Cao et al. | |
| 2020/0068593 A1* | 2/2020 | Seo | H04W 76/36 |
| 2020/0314770 A1* | 10/2020 | Wu | H04L 5/10 |
| 2021/0022139 A1* | 1/2021 | Shin | H04W 72/20 |
| 2021/0045089 A1* | 2/2021 | Yu | H04W 74/0808 |
| 2021/0400632 A1* | 12/2021 | Yang | H04L 5/0053 |
| 2022/0167362 A1* | 5/2022 | Liu | H04W 72/542 |
| 2022/0201528 A1* | 6/2022 | Shin | H04W 92/18 |

OTHER PUBLICATIONS

Mediatek Inc., On sidelink mode-2 resource allocation, R1-1912106, 3GPP TSG RAN WG1 Meeting #99, Reno, USA, Nov. 9, 2019, see sections 1 and 2.5.1.

Zte et al., Discussion on QoS management, R1-1910300, 3GPP TSG RAN WG1 #98bis, Chongqing, China, Oct. 6, 2019, see sections 2.1-2.2.

"3rd Generation Partnership Project; Technical Specification Group Radio Access Network; Evolved Universal Terrestrial Radio Access (E-UTRA); Physical layer procedures (Release 15)", 3GPP Standard; Technical Specification; 3GPP TS 36.213 V15.7.0 (Sep. 28, 2019), pp. 477-533, XP051785082.

"3rd Generation Partnership Project; Technical Specification Group Radio Access Network; Evolved Universal Terrestrial Radio Access (E-UTRA); Physical layer; Measurements (Release 15)", 3GPP TS 36.214 V15.4.0 (Sep. 28, 2019), pp. 1-25, XP051785084.

"3rd Generation Partnership Project; Technical Specification Group Radio Access Network; NR; Physical channels and modulation (Release 15)", 3GPP TS 38.211 V.15.7.0 (Sep. 28, 2019), pp. 1-97, XP051785087.

Huawei, HiSilicon, "QoS management for NR sidelink", 3GPP TSG RAN WG1 Meeting #99, Nov. 18-22, 2019, R1-1911888.

LG Electronics, "Feature lead summary #3 for AI 7.2.4.5 Physical layer procedures for sidelink", 3GPP TSG RAN WG1 #99, Nov. 18-22, 2019, R1-1913572.

\* cited by examiner

FIG. 4
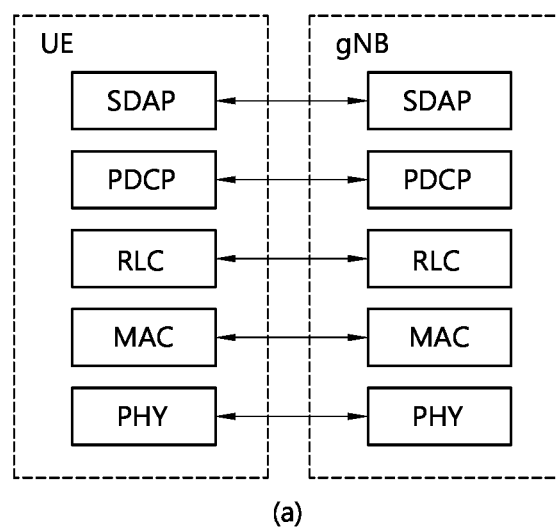
(a)
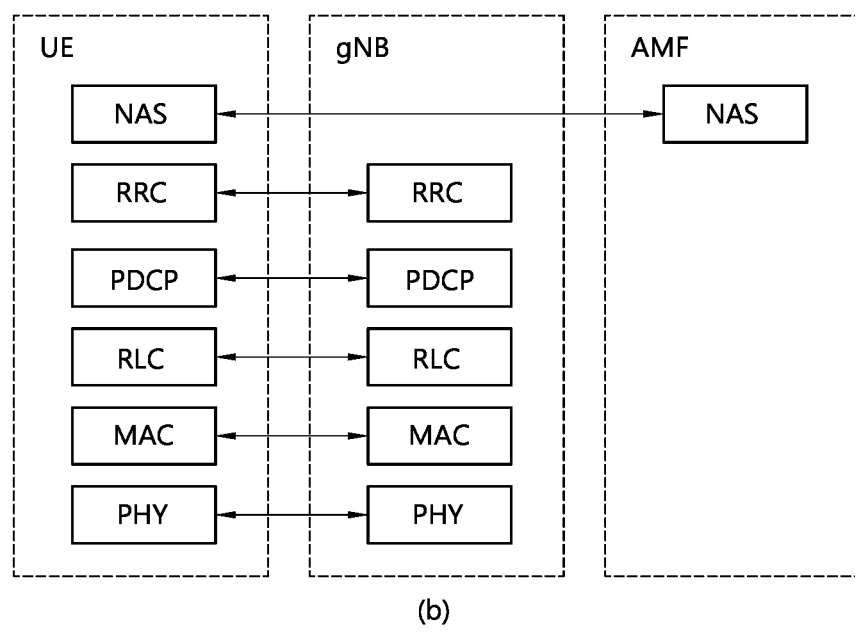
(b)

FIG. 8
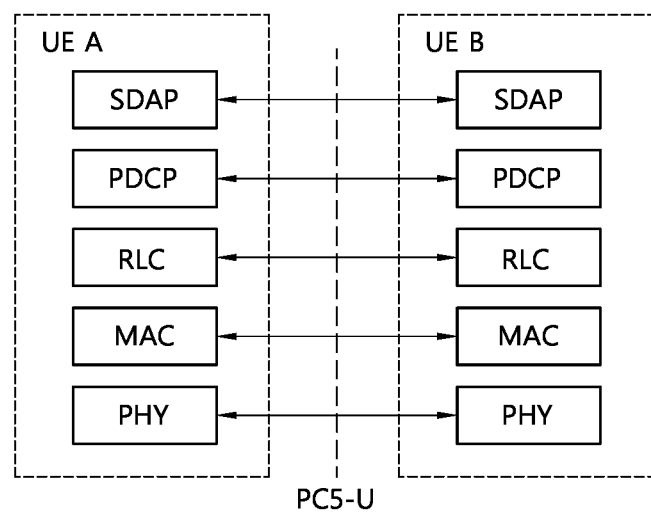
(a)
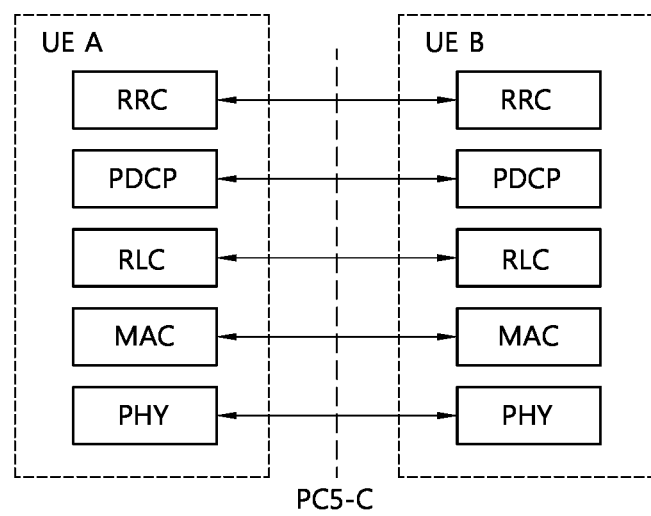
(b)

FIG. 13
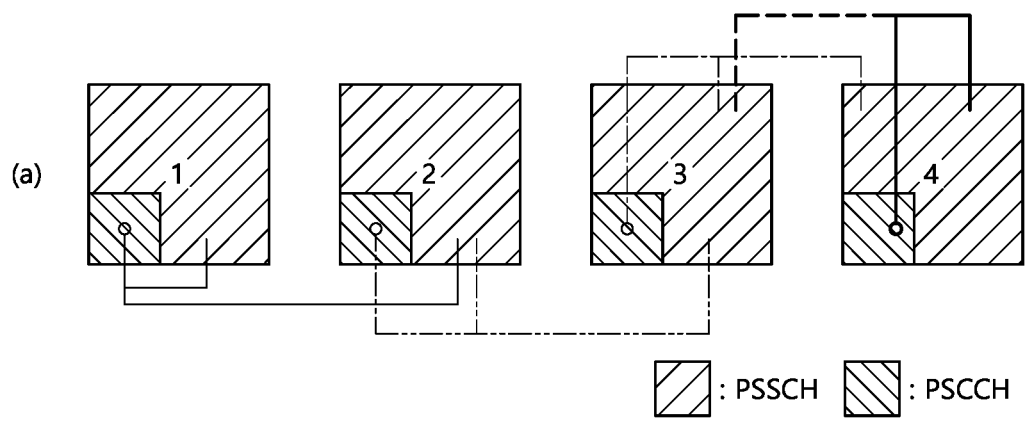
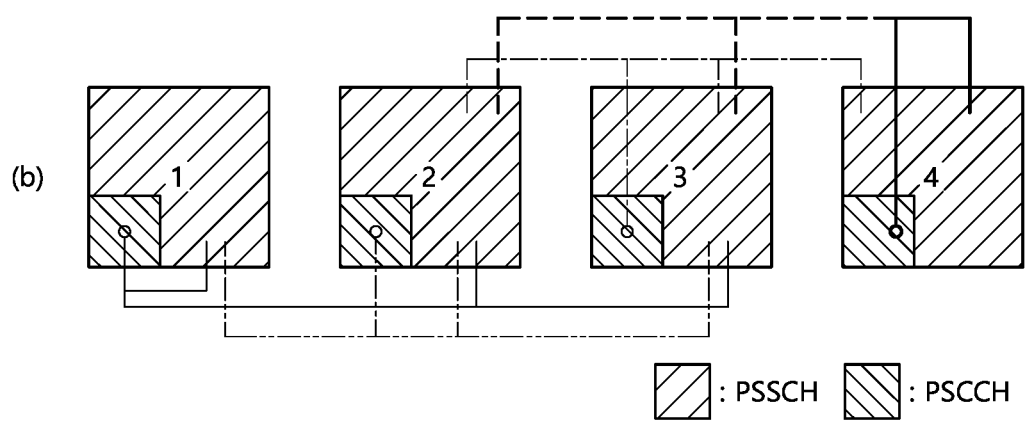
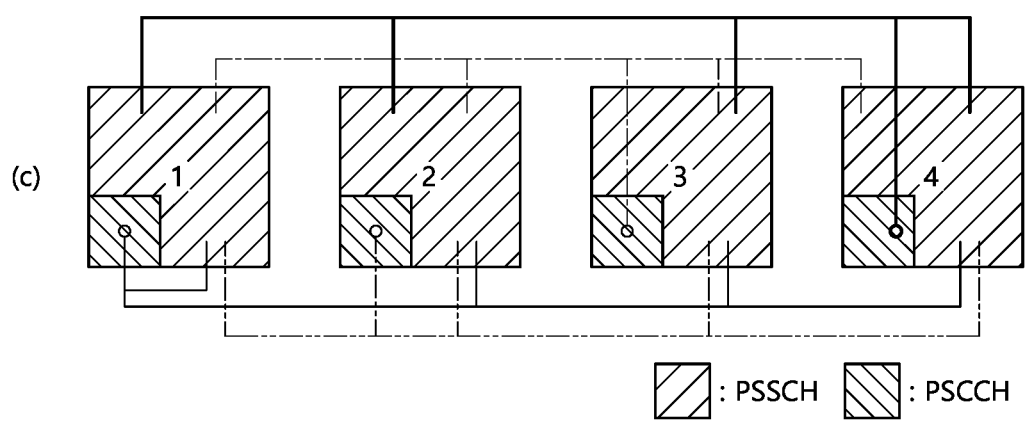

METHOD AND DEVICE FOR PERFORMING CONGESTION CONTROL IN NR V2X

This application is the National Stage filing under 35 U.S.C. 371 of International Application No. PCT/KR2020/016449 filed on Nov. 20, 2020, which claims priority to U.S. Provisional Application No. 62/938,296 filed on Nov. 20, 2019; 62/938,937 filed on Nov. 21, 2019; 62/938,899 filed on Nov. 21, 2019; 62/940,876 filed on Nov. 26, 2019; Korean Patent Application Nos. 10-2019-0153820 filed on Nov. 26, 2019 and 10-2019-0154903 filed on Nov. 27, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in SL communication, the UE needs to perform congestion control. For example, the UE may determine the power for SL transmission based on congestion control. Meanwhile, if the UE performs SL transmission in a specific slot, it may be ambiguous as to which slot the UE should use the measured congestion level. Accordingly, there is a need to propose a method for the UE to perform congestion control and an apparatus supporting the same.

Technical Solutions

In one embodiment, a method for performing, by a first device, wireless communication is provided. The method may comprise: measuring, in a first slot, a channel busy ratio (CBR) for a resource pool; determining power for physical sidelink shared channel (PSSCH) transmission in a second slot, based on the CBR measured in the first slot; and performing, to a second device, the PSSCH transmission in the second slot based on the power. For example, the first slot may be a slot before N slots from the second slot, and the N may be determined based on subcarrier spacing (SCS) related to the PSSCH transmission, and the N may be a positive integer.

In one embodiment, a first device configured to perform wireless communication is provided. The first device may comprise: one or more memories storing instructions; one or more transceivers; and one or more processors connected to the one or more memories and the one or more transceivers. The one or more processors may execute the instructions to: measure, in a first slot, a channel busy ratio (CBR) for a resource pool; determine power for physical sidelink shared channel (PSSCH) transmission in a second slot, based on the CBR measured in the first slot; and perform, to a second device, the PSSCH transmission in the second slot based on the power. For example, the first slot may be a slot before N slots from the second slot, and the N may be determined based on subcarrier spacing (SCS) related to the PSSCH transmission, and the N may be a positive integer.

Effects of the Disclosure

The user equipment (UE) may efficiently perform SL communication. The understanding/assumption of the UE for the congestion control-related CBR measurement time and PSSCH PRG unit may be clarified.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 13 shows a method in which a UE that has reserved transmission resource(s) informs another UE of the transmission resource(s), based on an embodiment of the present disclosure.

DESCRIPTION OF EXEMPLARY EMBODIMENTS

Figure 1:
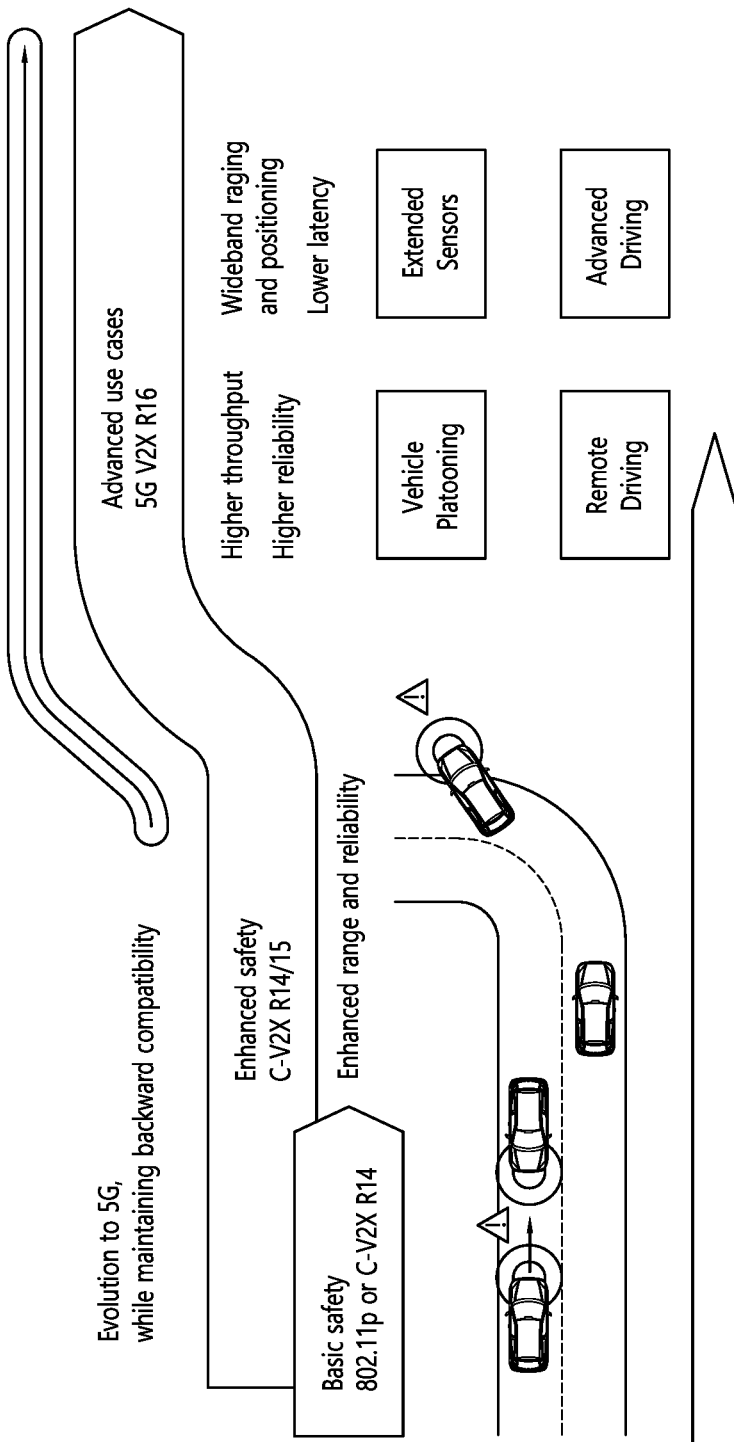
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
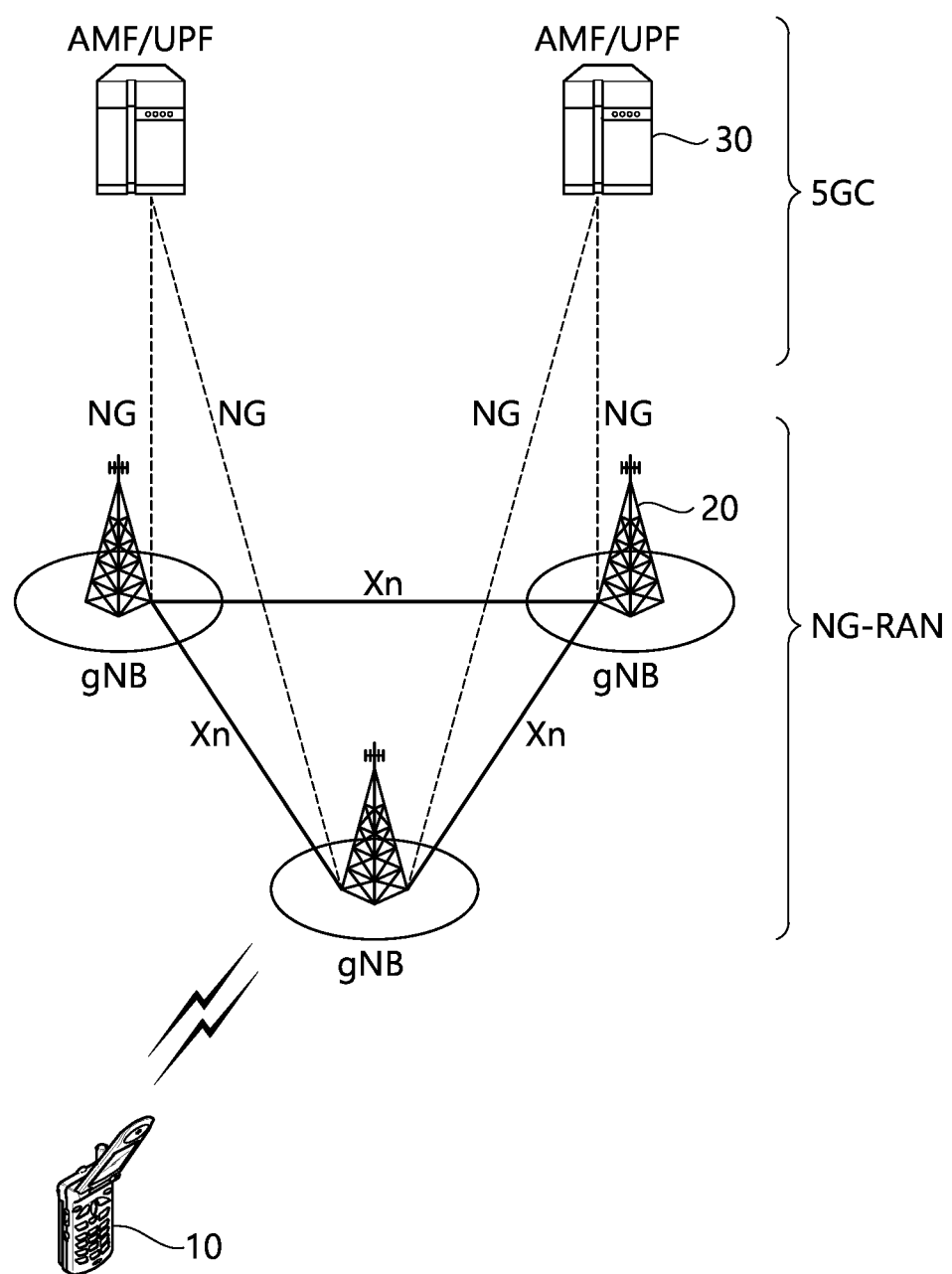
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
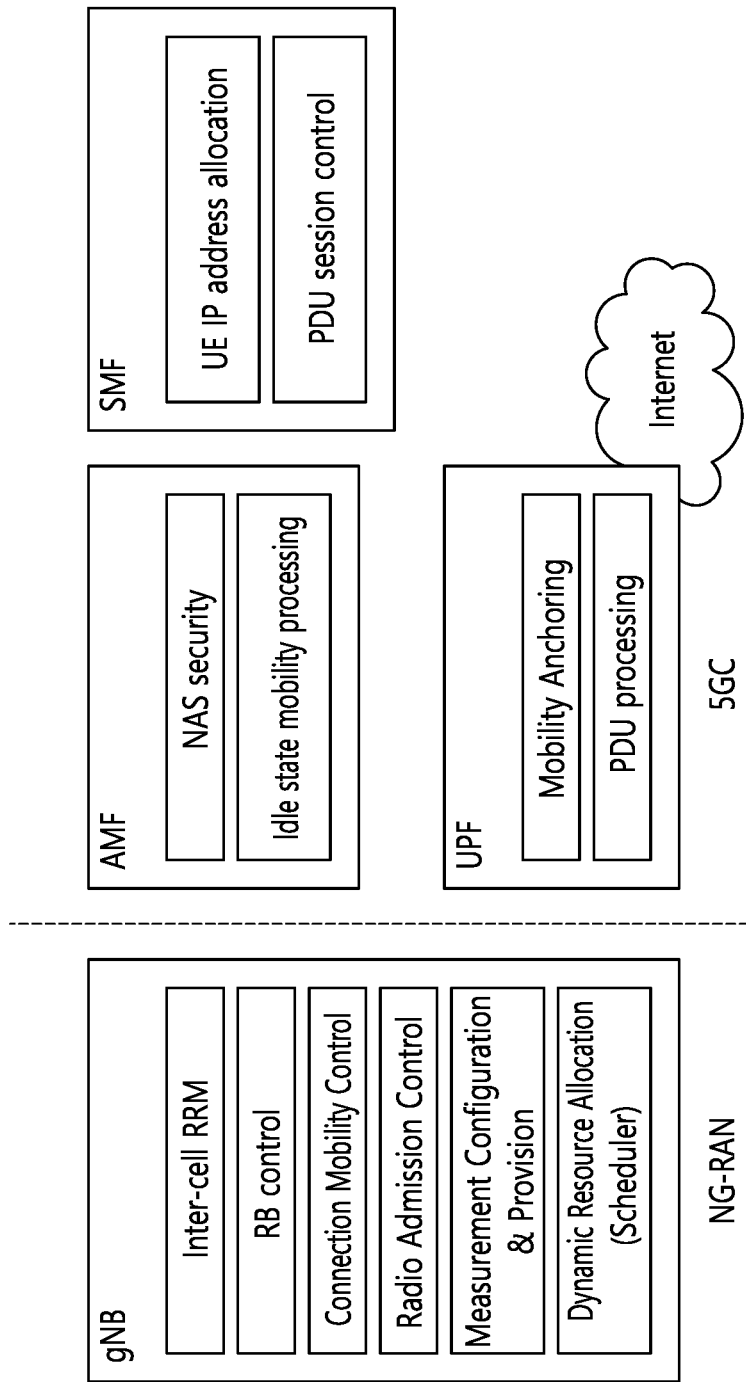
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4($a$) shows a radio protocol architecture for a user plane, and FIG. 4($b$) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
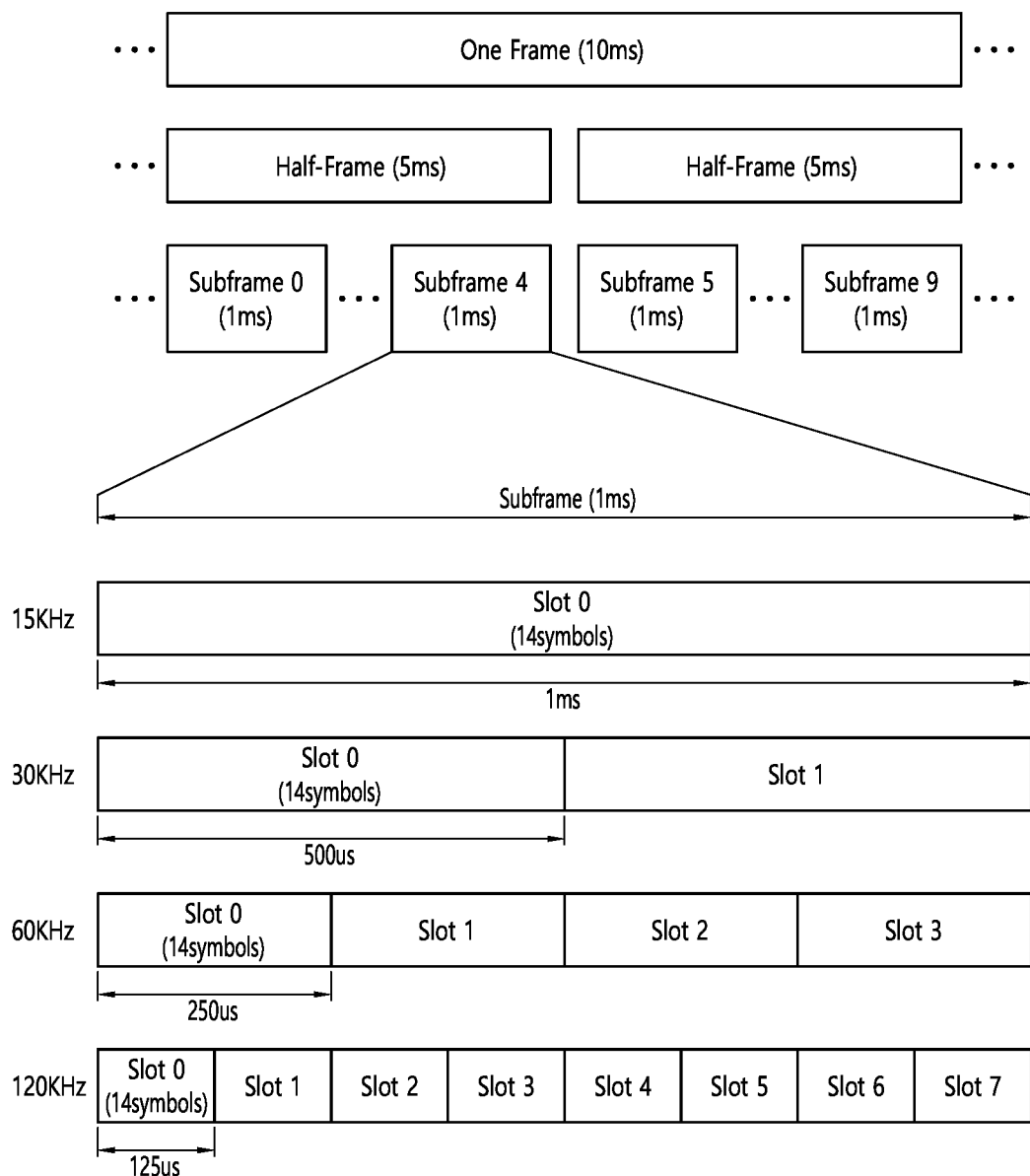
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * 2u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
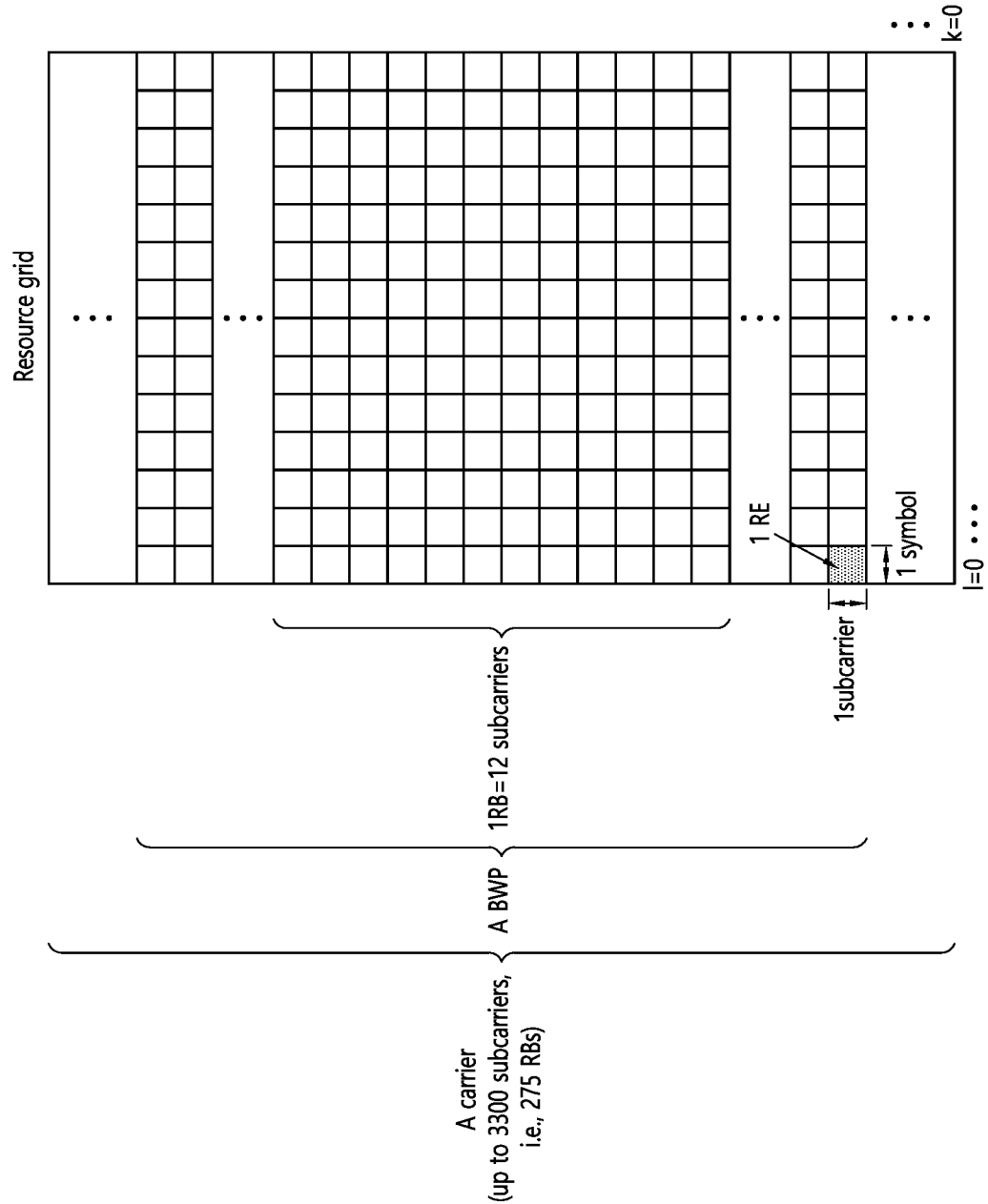
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
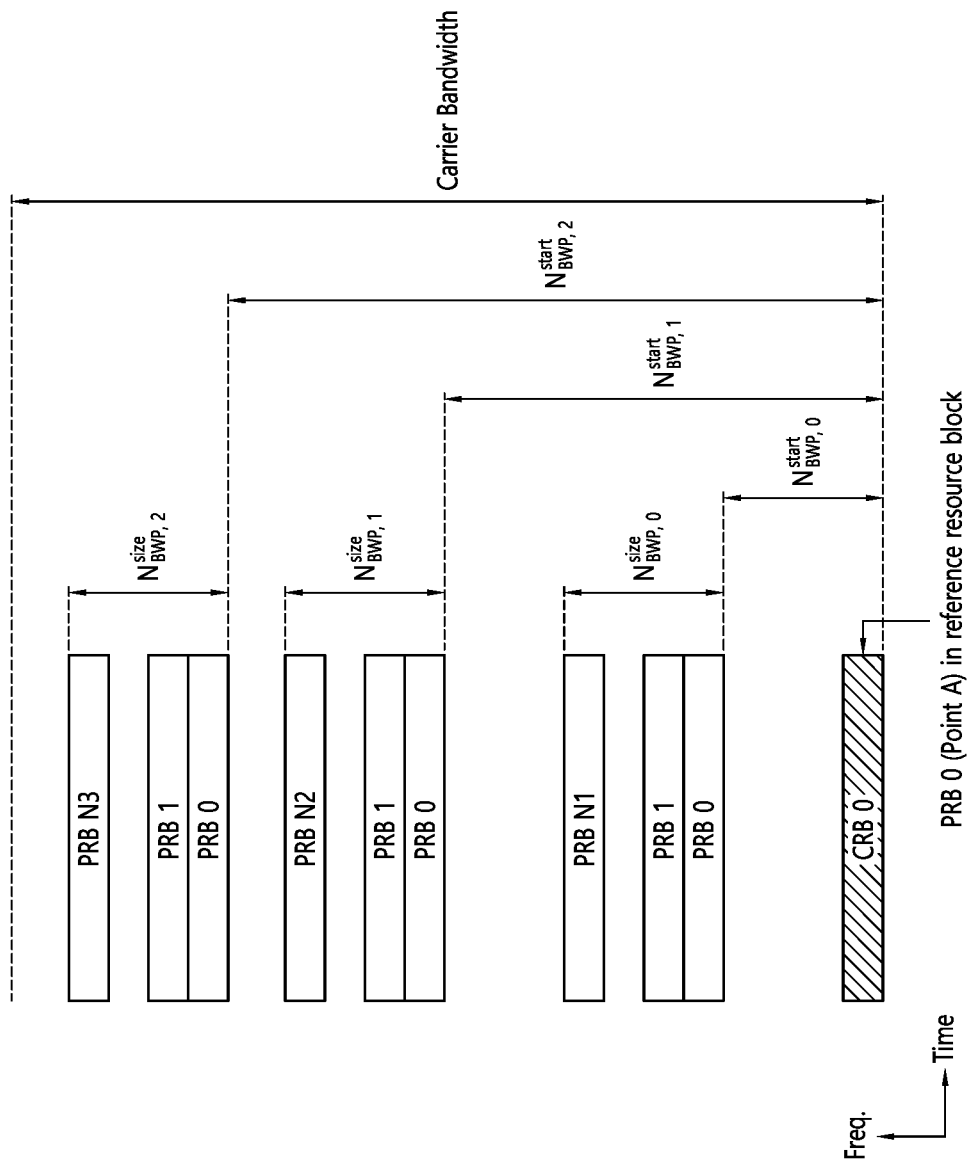
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
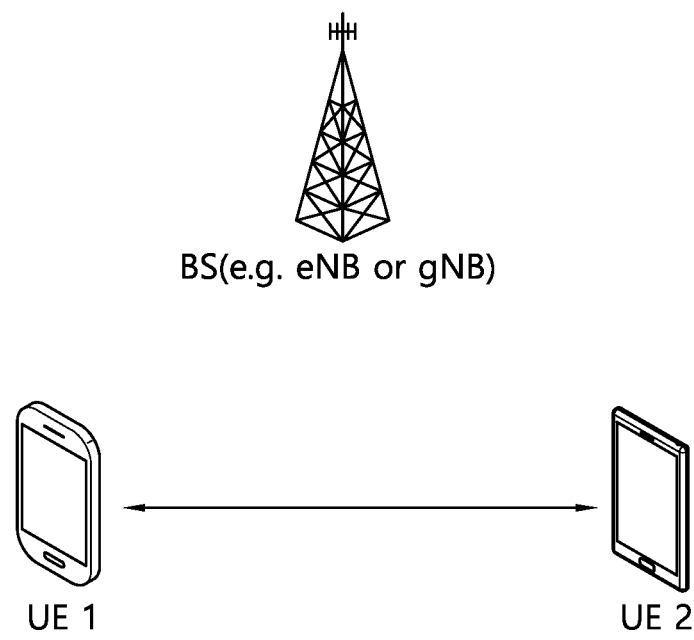
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
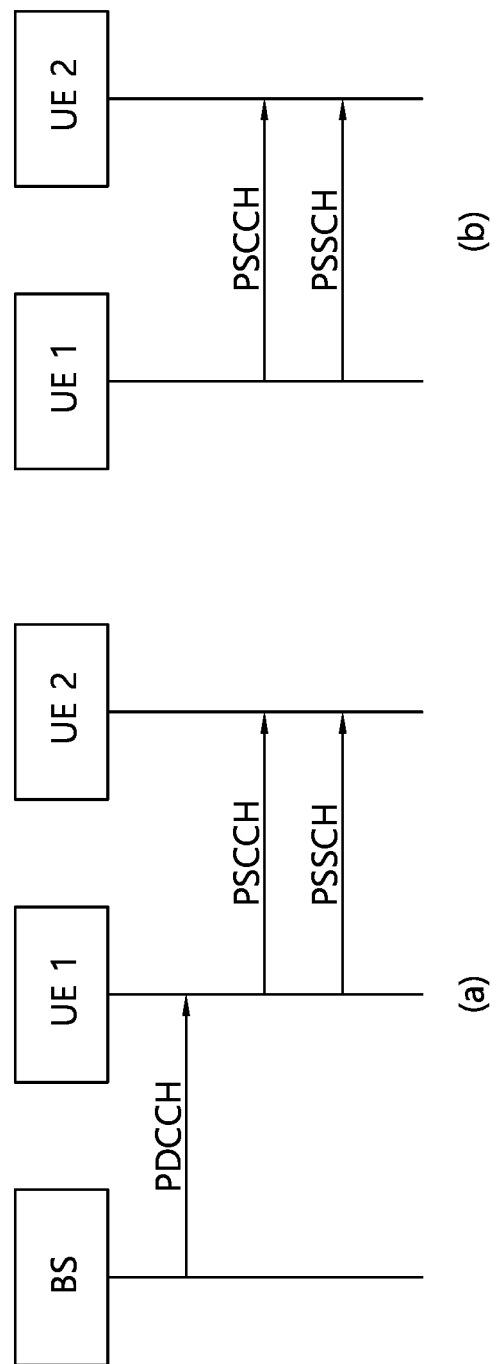
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
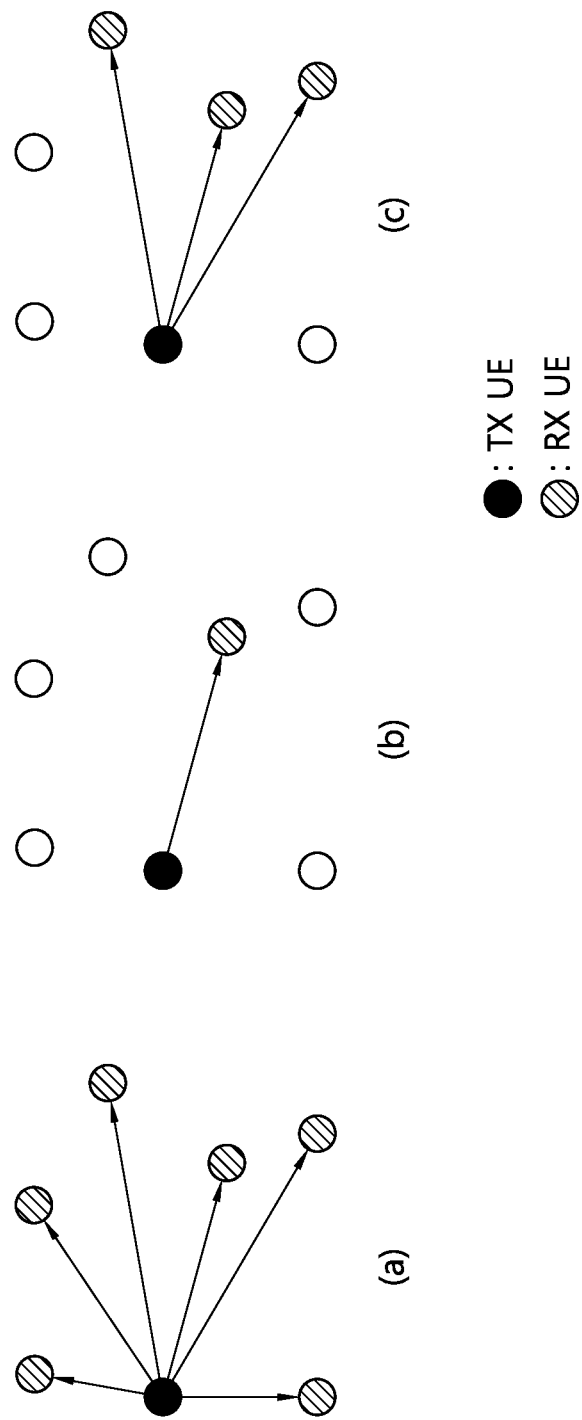
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
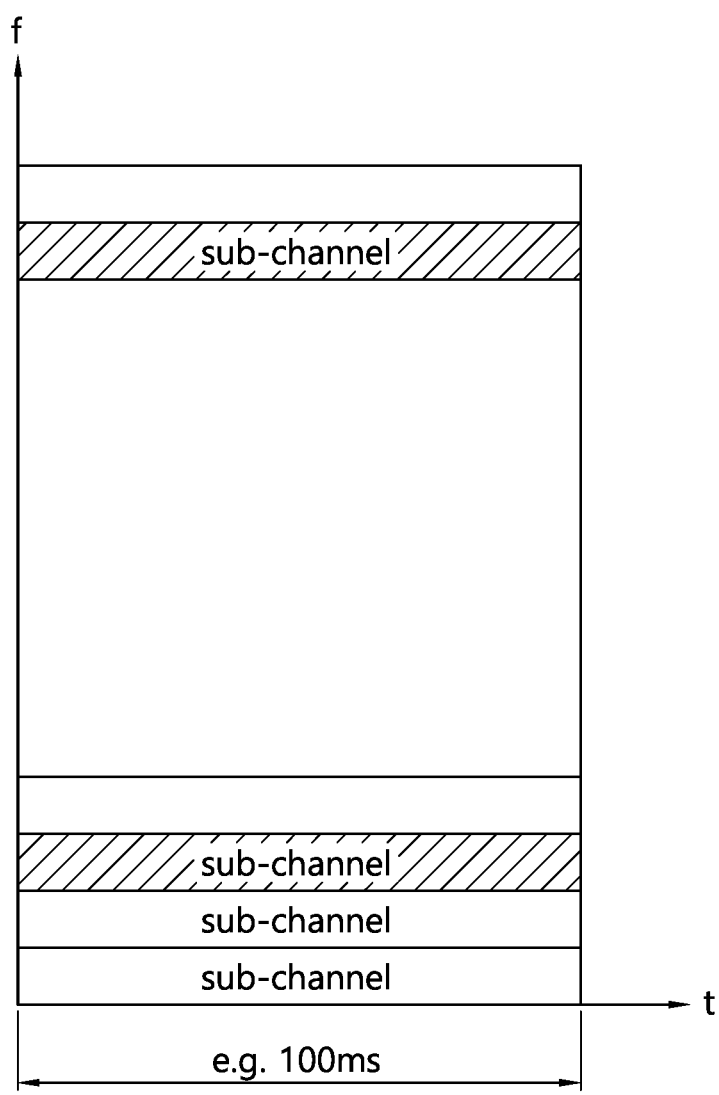
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g., packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an automatic gain control (AGC) duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal (DM-RS)) and/or a SL (L1) RSRP report request indicator, to the (target) RX UE, to be used for SL (L1) RSRP measurement. For example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE is a UE which transmits a SL (L1) RSRP measurement value, to the TX UE, measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, the TX UE may transmit at least one of the following information to the RX UE through SCI(s). Herein, for example, the TX UE may transmit at least one of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, a PSCCH may be replaced/substituted with a SCI and/or a first SCI and/or a second SCI, or vice versa. For example, the SCI may be replaced/substituted with the PSCCH and/or the first SCI and/or the second SCI, or vice versa. For example, since the TX UE may transmit the second SCI to the RX UE through a PSSCH, the PSSCH may be replaced/substituted with the second SCI, or vice versa. For example, if SCI configuration fields are divided into two groups in consideration of a (relatively) high SCI payload size, the first SCI including a first SCI configuration field group may be referred to as a $1^{st}$ SCI or $1^{st}$-stage SCI, and the second SCI including a second SCI configuration field group may be referred to as a $2^{nd}$ SCI or $2^{nd}$-stage SCI. For example, the first SCI may be transmitted through a PSCCH. For example, the second SCI may be transmitted through a (independent) PSCCH. For example, the second SCI may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool). For example, "that A is configured" may mean "that the base station/network transmits information related to A to the UE".

Meanwhile, in the present disclosure, for example, an RB may be replaced/substituted with a subcarrier, or vice versa. For example, a packet or a traffic may be replaced/substituted with a transport block (TB) or a medium access control protocol data unit (MAC PDU) based on a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in the present disclosure, a high priority may mean a small priority value, and a low priority may mean a large priority value. For example, Table 5 shows an example of priorities.

TABLE 5

| service or logical channel | priority value |
|---|---|
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 13 shows a method in which a UE that has reserved transmission resource(s) informs another UE of the transmission resource(s), based on an embodiment of the present disclosure. The embodiment of FIG. 13 may be combined with various embodiments of the present disclosure.

Specifically, for example, (a) of FIG. 13 shows a method for performing by a transmitting UE chain-based resource reservation by transmitting/signaling location information of (maximum) 2 transmission resources to receiving UE(s) through one SCI, in the case of a value of K=4. For example, (b) of FIG. 13 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 13, the transmitting UE may transmit/signal only location information of the fourth transmission-related resource to the receiving UE(s) through the fourth (or last) transmission-related PSCCH. For example, referring to (a) of FIG. 13, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 13, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 13, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 13, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 13 shows a method for performing by the transmitting UE block-based resource reservation, by signaling location information of 4 transmission resources to receiving UE(s) through one SCI, in the case of a value of K=4.

Meanwhile, if a SL HARQ feedback operation is configured/applied to the UE performing SL communication, service-related requirements (e.g., reliability, error rate, etc.) may be efficiently satisfied. To this end, for example, the TX UE may transmit SL information through a PSSCH and/or a PSCCH, and the RX UE may transmit SL HARQ feedback information through a PSFCH. For example, the TX UE may transmit SL information to a target RX UE of the TX UE through the PSSCH and/or the PSCCH. For example, the RX UE may be a target RX UE of the TX UE. For example, the RX UE may transmit SL HARQ feedback information to the TX UE through the PSFCH. For example, the composition of the SL HARQ feedback information and/or the amount of the SL HARQ feedback information (e.g., the number of bits) transmitted by the RX UE through the PSFCH may be determined/defined based on some or all of the following schemes.

(1) Dynamic Codebook

For example, the composition of SL HARQ feedback information and/or the amount of SL HARQ feedback information transmitted by the RX UE through the PSFCH may be determined/defined based on a dynamic codebook. In this case, for example, based on the number of (new) TBs transmitted by the TX UE, the RX UE may change/determine the amount of SL HARQ feedback information to be transmitted. For example, based on the number of (new) TBs transmitted by the TX UE, the RX UE may change/determine the amount of SL HARQ feedback information to be transmitted to the TX UE.

For example, if the RX UE fails to decode a PSCCH, for example, if the RX UE fails to decode the PSCCH transmitted by the TX UE, the TX UE should perform blind decoding for the amount of SL HARQ feedback information transmitted by the RX UE through the PSFCH and/or the PSFCH resource used by the RX UE for transmission of SL HARQ feedback information. For example, based on the amount of SL HARQ feedback information transmitted by the RX UE, the RX UE may generate/transmit SL HARQ feedback information by using phase values the number of different cyclic shifts (CSs) related to a zadoff-chu (ZC) sequence. For example, if the SL HARQ feedback information transmitted by the RX UE is 1 bit, the RX UE may generate/transmit the SL HARQ feedback information by using 2 CS values. For example, if the SL HARQ feedback information transmitted by the RX UE is 2 bits, the RX UE may generate/transmit the SL HARQ feedback information by using 4 CS values. For example, if the TX UE transmits 3 TBs to the RX UE and the RX UE fails to decode a PSCCH related to 1 TB, the RX UE may transmit 2-bit HARQ feedback information to the TX UE. In this case, the TX UE expecting to receive 3-bit HARQ feedback information should perform blind decoding for the HARQ feedback information.

Herein, for example, in order to alleviate the problem that the TX UE performs blind decoding for the amount of SL HARQ feedback information transmitted by the RX UE through the PSFCH and/or the PSFCH resource used by the RX UE for transmission of SL HARQ feedback information, the TX UE may transmit, to the RX UE, a SCI including an indicator field indicating how many times (new) TB transmission the TX UE has performed to the RX UE. For example, the SCI may be a $2^{nd}$ SCI.

(2) (Semi) Static Codebook

For example, the composition of SL HARQ feedback information and/or the amount of SL HARQ feedback information transmitted by the RX UE through the PSFCH may be determined/defined based on a (semi) static codebook.

For example, the number of slots of a PSSCH resource related to a PSFCH resource and/or the number of slots of a PSCCH resource related to the PSFCH resource may be configured or pre-configured for the UE. For example, the number of slots of the PSSCH resource related to the PSFCH resource and/or the number of slots of the PSCCH resource related to the PSFCH resource may be configured or pre-configured for the UE for each resource pool.

For example, the location of a PSSCH resource related to a PSFCH resource and/or the location of a PSCCH resource related to the PSFCH resource may be configured or pre-configured for the UE. For example, the location of the PSSCH resource related to the PSFCH resource and/or the location of the PSCCH resource related to the PSFCH resource may be configured or pre-configured for the UE for each resource pool.

For example, an index of a PSSCH resource related to a PSFCH resource and/or an index of a PSCCH resource related to the PSFCH resource may be configured or pre-configured for the UE. For example, the index of the PSSCH resource related to the PSFCH resource and/or the index of the PSCCH resource related to the PSFCH resource may be configured or pre-configured for the UE for each resource pool.

For example, based on at least one of the number of slots of the PSSCH resource related to the PSFCH resource, the number of slots of the PSCCH resource related to the PSFCH resource, the location of the PSSCH resource related to the PSFCH resource, the location of the PSCCH resource related to the PSFCH resource, the index of the PSSCH resource related to the PSFCH resource and/or the index of the PSCCH resource related to the PSFCH resource, the UE may determine the amount of SL HARQ feedback information included in the PSFCH.

For example, the RX UE may preferentially include feedback information related to a PSSCH slot and/or a PSCCH slot with a relatively low index (prior to a PSFCH slot) in SL HARQ feedback information (on a specific PSFCH) sequentially. For example, the RX UE may preferentially include feedback information related to a PSSCH slot and/or a PSCCH slot with a relatively high index (prior to a PSFCH slot) in SL HARQ feedback information (on a specific PSFCH) sequentially. For example, the RX UE may preferentially include feedback information related to a PSSCH slot and/or a PSCCH slot with a pre-configured index (prior to a PSFCH slot) in SL HARQ feedback information (on a specific PSFCH) sequentially. In addition, for example, the RX UE may transmit the SL HARQ feedback information to the TX UE through the specific PSFCH.

Based on various embodiments of the present disclosure, the UE may measure/obtain CBR based on Table 6.

TABLE 6

| | |
|---|---|
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or 100 · $2^\mu$ |

TABLE 6-continued

| | |
|---|---|
| | slots, according to higher layer parameter timeWindowSize-CBR. |
| Applicable for | RRC_IDLE intra-frequency, RRC_IDLE inter-frequency, RRC_CONNECTED intra-frequency, RRC_CONNECTED inter-frequency |

NOTE 1:
The slot index is based on physical slot index.

Based on various embodiments of the present disclosure, the UE may measure/obtain CR based on Table 7.

TABLE 7

| | |
|---|---|
| Definition | Sidelink Channel Occupancy Ratio (SL CR) evaluated at slot n is defined as the total number of sub-channels used for its transmissions in slots [n − a, n − 1] and granted in slots [n, n + B] divided by the total number of configured sub-channels in the transmission pool over [n − a, n + b]. |
| Applicable for | RRC_IDLE intra-frequency, RRC_IDLE inter-frequency, RRC_CONNECTED intra-frequency, RRC_CONNECTED inter-frequency |

NOTE 1:
a is a positive integer and b is 0 or a positive integer; a and b are determined by UE implementation with a + b + 1 = 1000 or 1000 · $2^\mu$ slots, according to higher layer parameter timeWindowSize-CR, b < (a + b + 1)/2, and n + b shall not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + b] without packet dropping.
NOTE 4:
The slot index is based on physical slot index.
NOTE 5:
SL CR can be computed per priority level
NOTE 6:
A resource is considered granted if it is a member of a selected sidelink grant.

Meanwhile, for example, in order for a first UE to obtain/calculate SL CSI information, a non-zero power (NZP) CSI-RS and a channel state information-interference measurement (CSI-IM) may be configured for the first UE. For example, a second UE may transmit the NZP CSI-RS and/or the CSI-IM to the first UE, and the first UE may calculate/obtain SL channel state information (CSI) information for the second UE based on the NZP CSI-RS and/or the CSI-IM. For example, the CSI-IM may be a zero power (ZP) CSI-RS. Herein, for example, the first UE may use the NZP CSI-RS for desired link quality/channel measurement/channel estimation, and the first UE may use the CSI-IM for interference measurement and/or interference estimation.

For example, the second UE may transmit the NZP CSI-RS and/or the CSI-IM only on a (scheduled) PSSCH resource region. For example, the second UE may transmit the NZP CSI-RS and/or the CSI-IM only when transmitting a PSSCH.

For example, the second UE may transmit the NZP CSI-RS and/or the CSI-IM only on a (scheduled) PSSCH and/or PSCCH resource region. For example, the second UE may transmit the NZP CSI-RS and/or the CSI-IM only when transmitting a PSSCH and/or a PSCCH.

Meanwhile, after the TX UE requests the RX UE to report SL CSI information, it is unclear that the TX UE can request additional SL CSI information reporting within a related (reporting) latency budget if a certain condition is satisfied. Meanwhile, if congestion control (e.g., the maximum allowed transmit power value) is applied to a SL transmission operation performed at a specific time, it is unclear the relationship between (related) CBR measurement timing and SL numerology (e.g., SCS). Meanwhile, when the TX UE performs PSSCH transmission, it is unclear how a precoding resource block group (PRG) is defined.

Figure 14:
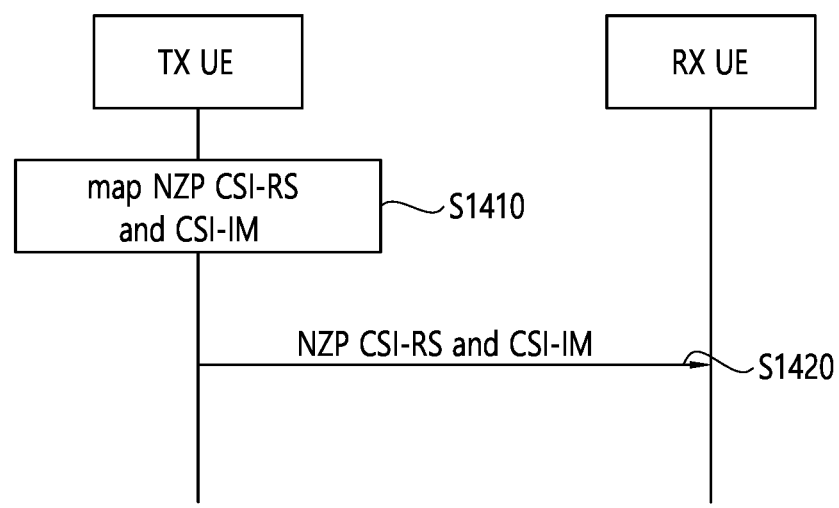
FIG. 14 shows a procedure for a UE to transmit a CSI-RS and/or a CSI-IM, based on an embodiment of the present disclosure.

FIG. 14 shows a procedure for a UE to transmit a CSI-RS and/or a CSI-IM, based on an embodiment of the present disclosure. The embodiment of FIG. 14 may be combined with various embodiments of the present disclosure.

Referring to FIG. 14, in step S1410, the UE may map the NZP CSI-RS and/or the CSI-IM to a resource block (e.g., RE). In step S1420, the UE may transmit the NZP CSI-RS and/or the CSI-IM.

For example, the UE may transmit the NZP CSI-RS and/or the CSI-IM by (limitedly) mapping to the same symbol. For example, the UE may not map data information to an RE located in the form of FDM with respect to a symbol (e.g., RE) to which the NZP CSI-RS and/or the CSI-IM is mapped. Specifically, for example, the data information and the NZP CSI-RS may be mapped to symbols in the form of TDM. Specifically, for example, the data information and the CSI-IM may be mapped to symbols in the form of TDM. For example, the UE may not map a $2^{nd}$ SCI to an RE located in the form of FDM with respect to a symbol (e.g., RE) to which the NZP CSI-RS and/or the CSI-IM is mapped. Specifically, for example, the $2^{nd}$ SCI and the NZP CSI-RS may be mapped to symbols in the form of TDM. Specifically, for example, the $2^{nd}$ SCI and the CSI-IM may be mapped to symbols in the form of TDM. For example, the UE may not map a PT-RS to an RE located in the form of FDM with respect to a symbol (e.g., RE) to which the NZP CSI-RS and/or the CSI-IM is mapped. Specifically, for example, the PT-RS and the NZP CSI-RS may be mapped to symbols in the form of TDM. Specifically, for example, the PT-RS and the CSI-IM may be mapped to symbols in the form of TDM. For example, the data information/$2^{nd}$ SCI/PT-RS and the NZP CSI-RS/CSI-IM may be mapped to symbols in the form of TDM.

For example, if the above rule is applied, the UE may map only the NZP CSI-RS and the CSI-IM to a specific symbol. That is, for example, the UE may map and transmit only the NZP CSI-RS and the CSI-IM to the specific symbol, and the data information, the $2^{nd}$ SCI, the PT-RS, etc. may not be mapped to the specific symbol.

For example, if Power Spectral Density (PSD) boosting of the NZP CSI-RS is applied/configured for the UE (in a resource pool-specific manner), the UE may not map a $2^{nd}$ SCI to an RE located in the form of FDM with respect to a symbol (e.g., RE) to which the NZP CSI-RS and/or the CSI-IM is mapped (exceptionally). For example, if Power Spectral Density (PSD) boosting of the NZP CSI-RS is applied/configured for the UE (in a resource pool-specific manner), the UE may not map data information to an RE located in the form of FDM with respect to a symbol (e.g., RE) to which the NZP CSI-RS and/or the CSI-IM is mapped (exceptionally). For example, if Power Spectral Density (PSD) boosting of the NZP CSI-RS is applied/configured for the UE (in a resource pool-specific manner), the UE may not map a PT-RS to an RE located in the form of FDM with respect to a symbol (e.g., RE) to which the NZP CSI-RS and/or the CSI-IM is mapped (exceptionally). In this case, for example, since the PSD of the RE related to the $2^{nd}$ SCI and/or the data information on the symbol to which the CSI-IM is mapped is increased compared to other symbols (e.g., a symbol to which only the $2^{nd}$ SCI and/or the data information is mapped), the problem of occurrence of a transient period can be alleviated.

For example, if the UE maps at least one of the $2^{nd}$ SCI, the data information, and/or the PT-RS to an RE located in the form of FDM with respect to a symbol to which the CSI-IM is mapped, the UE may be configured not to adopt the PSD of the CSI-IM (RE). Specifically, for example, if the UE maps at least one of the $2^{nd}$ SCI, the data information, and/or the PT-RS to an RE located in the form of FDM with respect to a symbol to which the CSI-IM is mapped, the UE may allocate power to an RE to which the CSI-IM is mapped. Specifically, for example, if the UE maps at least one of the $2^{nd}$ SCI, the data information, and/or the PT-RS to an RE located in the form of FDM with respect to a symbol to which the CSI-IM is mapped, the UE may assume that an RE to which the CSI-IM is mapped is an RE to which the data information and/or the $2^{nd}$ SCI is mapped, and the UE may allocate power to the RE to which the CSI-IM is mapped. In this case, the RE to which the CSI-IM is mapped may be interpreted as an RE to which the virtual data information and/or the virtual $2^{nd}$ SCI is mapped.

For example, based on the above-described embodiment, the PSD boosting operation of the NZP CSI-RS (RE) for improving channel estimation accuracy can be implemented relatively easily. For example, the PSD of the CSI-IM (RE) may be adopted for NZP CSI-RS. For example, based on the above-described embodiment, in terms of the UE receiving the NZP CSI-RS, if the UE transmits the NZP CSI-RS by performing the PSD boosting for the NZP CSI-RS (RE), the problem of reduced demodulation performance for the data information and/or the $2^{nd}$ SCI located in the form of FDM with the NZP CSI-RS (RE) can be alleviated.

Figure 15:
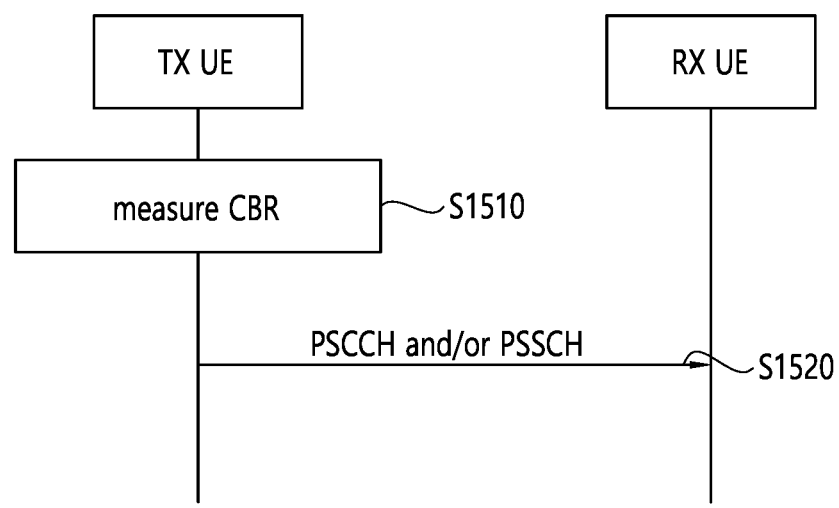
FIG. 15 shows a procedure for a UE to perform SL communication based on CBR, based on an embodiment of the present disclosure.

FIG. 15 shows a procedure for a UE to perform SL communication based on CBR, based on an embodiment of the present disclosure. The embodiment of FIG. 15 may be combined with various embodiments of the present disclosure.

Referring to FIG. 15, in step S1510, the UE may measure CBR. For example, the UE may measure the CBR for a resource pool. For example, the UE may measure the CBR based on Table 6, and may obtain a CBR value. In step S1520, the UE may perform SL transmission based on the CBR value. For example, the UE may transmit a PSCCH and/or a PSSCH based on the CBR value. For example, the UE may determine transmit power related to the PSCCH and/or the PSSCH based on the CBR value, and the UE may transmit the PSCCH and/or the PSSCH based on the transmit power.

For example, the maximum SL transmit power value of the UE may be configured differently for the UE for each CBR range. For example, the maximum SL transmit power value of the UE may be configured differently for the UE for each priority related to SL information (e.g., packet or service). Herein, for example, if the UE performs SL transmission on (logical) slot #N (in the resource pool), a CBR value used to set the maximum SL transmit power value of the UE may be a CBR value measured by the UE on (logical) slot #(N-X) (in the resource pool). For example, the X value may be configured differently or independently for the UE for each SL communication-related numerology (e.g., SCS). For example, as the SCS value increases, the X value may be configured to a relatively large value for the UE.

For example, Table 8 shows an example of the relationship between the SCS and the X value.

TABLE 8

| SCS ($15 * 2^u$) | Congestion control processing time X [slots] |
| --- | --- |
| 15 kHz (u = 0) | 2 |
| 30 kHz (u = 1) | 2 |

TABLE 8-continued

| SCS (15 * $2^u$) | Congestion control processing time X [slots] |
|---|---|
| 60 kHz (u = 2) | 4 |
| 120 kHz (u = 3) | 8 |

For example, Table 9 shows an example of the relationship between the SCS and the X value.

TABLE 9

| SCS (15 * $2^u$) | Congestion control processing time X [slots] |
|---|---|
| 15 kHz (u = 0) | 2 |
| 30 kHz (u = 1) | 4 |
| 60 kHz (u = 2) | 8 |
| 120 kHz (u = 3) | 16 |

For example, as the SCS value increases, the X value may be configured to a relatively small value for the UE. For example, the X value may be configured for the UE for each resource pool, regardless of SL communication-related numerology. For example, the X value may be configured for the UE for each service type. For example, the X value may be configured for the UE for each service priority. For example, the X value may be configured for the UE for each QoS requirement. For example, X may be 2. For example, the X value may be configured for the UE for each resource pool-related congestion level.

Based on an embodiment of the present disclosure, NZP CSI-RS related configuration information and/or CSI-IM related configuration information may be configured between UEs. For example, NZP CSI-RS related configuration information and/or CSI-IM related configuration information may be transmitted/received between a plurality of UEs. For example, NZP CSI-RS related configuration information and/or CSI-IM related configuration information may be transmitted/received between a plurality of UEs through PC5 RRC signaling. For example, NZP CSI-RS related configuration information and/or CSI-IM related configuration information may include at least one of CSI-RS related resource pattern information, CSI-RS related resource pattern number information, CSI-RS related antenna port information, and/or CSI-RS related antenna port number information.

As described above, if NZP CSI-RS related configuration information and/or CSI-IM related configuration information is configured between a plurality of UEs, ambiguity may occur among the configuration. Herein, for example, in order to solve the above-described problem, the UE may transmit by disabling the NZP CSI-RS and/or the CSI-IM. For example, the transmitting UE may disable the NZP CSI-RS and/or the CSI-IM in a SCI, and transmit it to the receiving UE.

For example, if the transmitting UE transmits/configures NZP CSI-RS related configuration information and/or CSI-IM related configuration information to the receiving UE through PC5-RRC signaling, the transmitting UE may transmit a TB including the PC5 RRC configuration to the receiving UE without the NZP CSI-RS and/or the CSI-IM. For example, if the transmitting UE fails to transmit TB(s) more than a pre-configured number of times, the transmitting UE may disable the NZP CSI-RS and/or the CSI-IM and transmit it to the receiving UE.

For example, if the transmitting UE fails to transmit TB(s) more than a pre-configured number of times, the transmitting UE may disable the NZP CSI-RS and/or the CSI-IM in a SCI and transmit it to the receiving UE. For example, if the transmitting UE receives NACK for TB(s) from the receiving UE more than a pre-configured number of times, the transmitting UE may disable the NZP CSI-RS and/or the CSI-IM and transmit it to the receiving UE. For example, if the transmitting UE receives NACK for TB(s) from the receiving UE more than a pre-configured number of times, the transmitting UE may disable the NZP CSI-RS and/or the CSI-IM in a SCI and transmit it to the receiving UE. For example, the base station/network may configure or pre-configure information related to the pre-configured number of times to the transmitting UE. For example, the pre-configured number of times may be pre-defined in the transmitting UE.

For example, the transmitting UE may determine whether to disable the NZP CSI-RS and/or the CSI-IM, and the transmitting UE may disable the NZP CSI-RS and/or the CSI-IM based on the determination and transmit it to the receiving UE. For example, the transmitting UE may determine whether to disable the NZP CSI-RS and/or the CSI-IM in a SCI, and the transmitting UE may disable the NZP CSI-RS and/or the CSI-IM in the SCI based on the determination and transmit it to the receiving UE.

Based on an embodiment of the present disclosure, the UE may transmit/signal, through a $1^{st}$ SCI (e.g., PSCCH), information informing a UE type or a UE (sub-)group that needs to receive/decode information related to messages/packets on a PSSCH related/scheduled with the $1^{st}$ SCI. For example, the UE may transmit/signal, through a $1^{st}$ SCI (e.g., PSCCH), information informing a UE type or a UE (sub-)group that needs to receive/decode a $2^{nd}$ SCI related/scheduled with the $1^{st}$ SCI. For example, the UE may transmit/signal, through a $2^{nd}$ SCI, information informing a UE type or a UE (sub-)group that needs to receive/decode information related to messages/packets on a PSSCH related/scheduled with the $2^{nd}$ SCI. For example, the UE type may include a pedestrian UE and/or a vehicle UE.

For example, a field in which the information is transmitted may be a pre-configured (partially) reserved bit in the $1^{st}$ SCI. For example, a field in which the information is transmitted may be a (partially) reserved bit of a pre-configured size in the $1^{st}$ SCI. For example, the UE may transmit/signal the information by using the pre-configured (partially) reserved bit in the $1^{st}$ SCI.

For example, if the UE transmits only some bits (e.g., X) of an L1 ID in the $1^{st}$ SCI, a field in which the information is transmitted may be the remaining bits (e.g., Y-X) except for X bits from bits (e.g., Y) required for the entire L1 ID transmission. For example, if the UE transmits only some bits (e.g., X) of an L1 ID in the $1^{st}$ SCI, the UE may transmit/signal the information by using the remaining bits (e.g., Y-X) except for X bits from bits (e.g., Y) required for the entire L1 ID transmission. For example, the L1 ID may include an L1 destination ID and/or an L1 source ID.

For example, the UE may transmit/signal information on a (target) UE type through a $1^{st}$ SCI. For example, the (target) UE type may be a UE type that requires an attempt to receive/decode message/packet information on a PSSCH related/scheduled with the $1^{st}$ SCI. For example, the (target) UE type may be a UE type that requires an attempt to receive/decode a $2^{nd}$ SCI related/scheduled with the $1^{st}$ SCI. For example, the UE type may include a pedestrian UE and/or a vehicle UE.

For example, the UE may transmit/signal information on a (sub-)group through a $1^{st}$ SCI. For example, the (sub-)group may be a (sub-)group in a (target) UE group identified by a (L1 or L2) destination ID. Herein, for example, if the above-mentioned rule is applied, it is possible to prevent a UE sensitive to battery/power consumption or a UE with limited (RF) capabilities (e.g., pedestrian UE) from performing excessive/meaningless decoding attempts for the message/packet information and/or the $2^{nd}$ SCI on the PSSCH that is not related to itself or is not interested in.

For example, the UE may transmit information related to a SL mode through a pre-configured reserved bit in a $1^{st}$ SCI (e.g., PSCCH). For example, the UE may be configured to transmit information related to the SL mode through the pre-configured reserved bit in the $1^{st}$ SCI (e.g., PSCCH). For example, the UE may transmit information related to the SL mode through a pre-configured reserved bit in a $2^{nd}$ SCI. For example, the UE may be configured to transmit information related to the SL mode through the pre-configured reserved bit in the $2^{nd}$ SCI. For example, the reserved bit may have a pre-configured size. For example, the information related to the SL mode may include information on the SL mode related to resource selection for SL transmission of the UE. For example, the information related to the SL mode may include mode 1 related information and/or mode 2 related information.

For example, the UE may transmit information related to a sensing type through a pre-configured reserved bit in a $1^{st}$ SCI (e.g., PSCCH). For example, the UE may be configured to transmit information related to the sensing type through the pre-configured reserved bit in the $1^{st}$ SCI (e.g., PSCCH). For example, the UE may transmit information related to the sensing type through a pre-configured reserved bit in a $2^{nd}$ SCI. For example, the UE may be configured to transmit information related to the sensing type through the pre-configured reserved bit in the $2^{nd}$ SCI. For example, the information related to the sensing type may include information on the sensing type used by the UE to select transmission resource(s). For example, the information related to the sensing type may include at least one of partial sensing, full sensing, and/or no sensing. For example, the partial sensing may include sensing performed only in a pre-configured partial time domain by a UE sensitive to battery/power consumption or a UE with a limited (RF) capability. For example, the UE sensitive to battery/power consumption or the UE with the limited (RF) capability may include a pedestrian UE. For example, the full sensing may include sensing performed in a relatively long time domain by a UE that is not sensitive to battery/power consumption or a UE with a relatively good (RF) capability compared to a UE performing partial sensing. For example, the UE that is not sensitive to battery/power consumption or the UE with the relatively good (RF) capability may include a vehicle UE. For example, no sensing may include selecting resource(s) randomly without a sensing operation by the UE.

For example, in order to preferentially protect a specific mode (e.g., mode 1) based transmission over another mode (e.g., mode 2) based transmission, the UE may transmit information related to the SL mode. For example, if the UE performs a resource exclusion operation and/or a resource selection operation, in order to preferentially protect a specific mode (e.g., mode 1) based transmission over another mode (e.g., mode 2) based transmission, the UE may transmit information related to the SL mode. For example, mode 1-based transmission may have a relatively higher priority than mode 2-based transmission.

For example, in order to preferentially protect a specific sensing type based transmission over another sensing type based transmission, the UE may transmit information related to the sensing type. For example, if the UE performs a resource exclusion operation and/or a resource selection operation, in order to preferentially protect a specific sensing type based transmission over another sensing type based transmission, the UE may transmit information related to the sensing type. For example, partial sensing-based transmission may have a relatively higher priority than full sensing-based transmission.

Based on an embodiment of the present disclosure, in SL communication, a precoding resource block group may be supported and/or defined according to a rule to be described below. For convenience of description, the precoding resource block group may be referred to as a PRG. For example, the PRG may be a group of resource blocks to which the same precoding is applied.

For example, the TX UE may transmit/signal information related to a PRG size used for PSSCH transmission to the RX UE through a SCI. For example, the SCI may be a $1^{st}$ SCI. For example, the TX UE may piggyback a $2^{nd}$ SCI on a PSSCH and transmit it. For example, the TX UE may transmit the $2^{nd}$ SCI through the PSSCH.

For example, the TX UE may transmit/signal information related to the PRG size used for PSSCH transmission to the RX UE through $2^{nd}$ SCI format indicator/information. For example, the TX UE may transmit/signal information related to the PRG size used for PSSCH transmission to the RX UE through the $2^{nd}$ SCI format indicator/information in the Pt SCI.

For example, information related to the PRG size used by the TX UE for PSSCH transmission may be (implicitly) determined/understood by a pre-configured rule. For example, the RX UE or the TX UE may (implicitly) determine/obtain information related to the PRG size used by the TX UE for PSSCH transmission based on the pre-configured rule.

For example, the TX UE may select/determine a PRG size value among candidate values related to the PRG size pre-configured specifically for a resource pool. For example, the PRG size value may be determined/obtained (implicitly) by the pre-configured rule. Specifically, for example, the RX UE or the TX UE may (implicitly) determine/obtain a PRG size value used by the TX UE for PSSCH transmission based on the pre-configured rule.

For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on the number of subchannels used for PSSCH transmission. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on an MCS value used for PSSCH transmission. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on a rank value used for PSSCH transmission. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on the number/index value of DMRS antenna ports used for PSSCH transmission. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on a congestion level (e.g., CBR) (in a resource pool). For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on a type of a service transmitted by the TX UE. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on a priority of a service transmitted by the TX UE. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on a QoS requirement (e.g., reliability and/or latency) of a service transmitted by the TX UE. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on speed of the TX UE and/or speed of the RX UE. For example, the speed may include absolute speed or relative speed. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on a cast type of the TX UE. For example, the cast type may include at least one of unicast, groupcast, and/or broadcast. For example, if the PRG size value used by the TX UE for PSSCH transmission is (implicitly) determined/obtained based on the pre-configured rule, the PRG size (candidate) value (selectable) of the TX UE or the RX UE may be configured/limited differently or independently based on the number of RBs included in a subchannel.

For example, if the TX UE selects/determines the PRG size value from candidate values related to the PRG size, the PRG size (candidate) value (selectable) of the TX UE may be configured/limited differently or independently based on the number of subchannels used for PSSCH transmission. For example, if the TX UE selects/determines the PRG size value from candidate values related to the PRG size, the PRG size (candidate) value (selectable) of the TX UE may be configured/limited differently or independently based on an MCS value used for PSSCH transmission. For example, if the TX UE selects/determines the PRG size value from candidate values related to the PRG size, the PRG size (candidate) value (selectable) of the TX UE may be configured/limited differently or independently based on a rank value used for PSSCH transmission. For example, if the TX UE selects/determines the PRG size value from candidate values related to the PRG size, the PRG size (candidate) value (selectable) of the TX UE may be configured/limited differently or independently based on the number/index value of DMRS antenna ports used for PSSCH transmission. For example, if the TX UE selects/determines the PRG size value from candidate values related to the PRG size, the PRG size (candidate) value (selectable) of the TX UE may be configured/limited differently or independently based on a congestion level (e.g., CBR) (in a resource pool). For example, if the TX UE selects/determines the PRG size value from candidate values related to the PRG size, the PRG size (candidate) value (selectable) of the TX UE may be configured/limited differently or independently based on a type of a service transmitted by the TX UE. For example, if the TX UE selects/determines the PRG size value from candidate values related to the PRG size, the PRG size (candidate) value (selectable) of the TX UE may be configured/limited differently or independently based on a priority of a service transmitted by the TX UE. For example, if the TX UE selects/determines the PRG size value from candidate values related to the PRG size, the PRG size (candidate) value (selectable) of the TX UE may be configured/limited differently or independently based on a QoS requirement (e.g., reliability and/or latency) of a service transmitted by the TX UE. For example, if the TX UE selects/determines the PRG size value from candidate values related to the PRG size, the PRG size (candidate) value (selectable) of the TX UE may be configured/limited differently or independently based on speed of the TX UE and/or speed of the RX UE. For example, the speed may include absolute speed or relative speed. For example, if the TX UE selects/determines the PRG size value from candidate values related to the PRG size, the PRG size (candidate) value (selectable) of the TX UE may be configured/limited differently or independently based on a cast type of the TX UE. For example, the cast type may include at least one of unicast, groupcast, and/or broadcast. For example, if the TX UE selects/determines the PRG size value from candidate values related to the PRG size, the PRG size (candidate) value (selectable) of the TX UE may be configured/limited differently or independently based on the number of RBs included in a subchannel.

For example, the TX UE may (independently) apply the PRG size determined according to the above-described embodiment for each subchannel unit (in a slot). For example, the TX UE may apply the PRG size determined according to the above-described embodiment to (all) RBs regardless of subchannels (in a slot).

For example, in case the TX UE applies the PRG size for each subchannel (in the slot), after the TX UE applies the PRG size in a subchannel, if the number of remaining RBs is smaller than the PRG size, the TX UE may determine/consider to apply the same precoding as other RBs in the subchannel to the remaining RBs. In addition, for example, the TX UE may apply the same precoding as other RBs in the subchannel to the remaining RB, and the TX UE may transmit SL information to the RX UE on the remaining RB.

For example, in case the TX UE applies the PRG size for each subchannel (in the slot), after the TX UE applies the PRG size in a subchannel, if the number of remaining RBs is smaller than the PRG size, the TX UE may determine/consider not to apply the same precoding as other RBs in the subchannel to the remaining RBs. In addition, for example, the TX UE may not apply the same precoding as other RBs in the subchannel to the remaining RBs, and the TX UE may transmit SL information to the RX UEs on the remaining RBs.

For example, in case the TX UE applies the PRG size to (all) RBs regardless of subchannels (in the slot), after the TX UE applies the PRG size to RBs (in the slot), if the number of remaining RBs is smaller than the PRG size, the TX UE may decide/consider to apply the same precoding as other RBs to the remaining RBs. In addition, for example, the TX UE may apply the same precoding as other RBs to the remaining RBs, and the TX UE may transmit SL information to the RX UEs on the remaining RBs.

For example, in case the TX UE applies the PRG size to (all) RBs regardless of subchannels (in the slot), after the TX UE applies the PRG size to RBs (in the slot), if the number of remaining RBs is smaller than the PRG size, the TX UE may determine/consider not to apply the same precoding as other RBs to the remaining RBs. In addition, for example, the TX UE may not apply the same precoding as other RBs to the remaining RBs, and the TX UE may transmit SL information to the RX UEs on the remaining RBs.

For example, if the size of the subchannel is less than or equal to a pre-configured threshold, the TX UE may apply the PRG for each subchannel size unit. For example, if the size of the subchannel is greater than or equal to a pre-configured threshold, the TX UE may apply the PRG for each pre-configured number of RBs.

For example, if the size of the subchannel is less than or equal to a pre-configured threshold, the TX UE may apply the PRG for each pre-configured number of RBs. For example, if the size of the subchannel is greater than or equal to a pre-configured threshold, the TX UE may apply the PRG for each subchannel size unit.

For example, if the number of subchannels used by the TX UE for PSSCH transmission is equal to or less than a pre-configured threshold, the TX UE may apply the PRG for each subchannel size unit. For example, if the number of subchannels used by the TX UE for PSSCH transmission is greater than or equal to a pre-configured threshold, the TX UE may apply the PRG for each pre-configured number of RBs.

For example, if the number of subchannels used by the TX UE for PSSCH transmission is less than or equal to a pre-configured threshold, the TX UE may apply the PRG for each pre-configured number of RBs. For example, if the number of subchannels used by the TX UE for PSSCH transmission is greater than or equal to a pre-configured threshold, the TX UE may apply the PRG for each subchannel size unit.

Based on an embodiment of the present disclosure, a (specific) relative speed-based TX parameter restriction value and/or a (specific) relative speed-based TX parameter restriction value range may be configured differently for the TX UE, based on at least one of a priority of a service transmitted by the TX UE, a type of a service transmitted by the TX UE, a QoS requirement (e.g., reliability and/or latency) related to a service transmitted by the TX UE, and/or a cast type. In addition, for example, the TX UE may transmit SL information to the RX UE based on the TX parameter restriction value and/or the TX parameter restriction value range. For example, the TX parameter restriction value may include at least one of the number of retransmissions of the TX UE, an MCS value used by the TX UE for transmission, and/or a transmit power value of the TX UE. For example, the TX parameter restriction range may include at least one of a range of the number of retransmissions of the TX UE, a range of MCS values used by the TX UE for transmission, and/or a range of transmit power values of the TX UE.

For example, a (specific) absolute speed-based TX parameter restriction value and/or a (specific) absolute speed-based TX parameter restriction value range may be configured differently for the TX UE, based on at least one of a priority of a service transmitted by the TX UE, a type of a service transmitted by the TX UE, a QoS requirement (e.g., reliability and/or latency) related to a service transmitted by the TX UE, and/or a cast type. In addition, for example, the TX UE may transmit SL information to the RX UE based on the TX parameter restriction value and/or the TX parameter restriction value range. For example, the TX parameter restriction value may include at least one of the number of retransmissions of the TX UE, an MCS value used by the TX UE for transmission, and/or a transmit power value of the TX UE. For example, the TX parameter restriction range may include at least one of a range of the number of retransmissions of the TX UE, a range of MCS values used by the TX UE for transmission, and/or a range of transmit power values of the TX UE.

For example, a relative speed value/range to which a specific TX parameter restriction value/range is applied may be configured differently for the TX UE, based on at least one of a priority of a service transmitted by the TX UE, a type of a service transmitted by the TX UE, a QoS requirement (e.g., reliability and/or latency) related to a service transmitted by the TX UE, and/or a cast type. For example, an absolute speed value/range to which a specific TX parameter restriction value/range is applied may be configured differently for the TX UE, based on at least one of a priority of a service transmitted by the TX UE, a type of a service transmitted by the TX UE, a QoS requirement (e.g., reliability and/or latency) related to a service transmitted by the TX UE, and/or a cast type.

For example, whether the TX UE applies the TX parameter restriction based on which speed among relative speed or absolute speed may be configured differently for the TX UE, based on at least one of a priority of a service transmitted by the TX UE, a type of a service transmitted by the TX UE, a QoS requirement (e.g., reliability and/or latency) related to a service transmitted by the TX UE, and/or a cast type. For example, based on at least one of a priority of a service transmitted by the TX UE, a type of a service transmitted by the TX UE, a QoS requirement (e.g., reliability and/or latency) related to a service transmitted by the TX UE, and/or a cast type, the TX UE may apply/determine the TX parameter restriction value/range based on the relative speed. For example, based on at least one of a priority of a service transmitted by the TX UE, a type of a service transmitted by the TX UE, a QoS requirement (e.g., reliability and/or latency) related to a service transmitted by the TX UE, and/or a cast type, the TX UE may apply/determine the TX parameter restriction value/range based on the absolute speed.

For example, based on at least one of a priority of a service transmitted by the TX UE, a type of a service transmitted by the TX UE, a QoS requirement (e.g., reliability and/or latency) related to a service transmitted by the TX UE, and/or a cast type, whether the TX UE restricts the TX parameter based on absolute speed may be configured differently for the TX UE. For example, based on at least one of a priority of a service transmitted by the TX UE, a type of a service transmitted by the TX UE, a QoS requirement (e.g., reliability and/or latency) related to a service transmitted by the TX UE, and/or a cast type, the TX UE may determine whether to restrict the TX parameter based on the absolute speed.

For example, based on at least one of a priority of a service transmitted by the TX UE, a type of a service transmitted by the TX UE, a QoS requirement (e.g., reliability and/or latency) related to a service transmitted by the TX UE, and/or a cast type, whether the TX UE restricts the TX parameter based on relative speed may be configured differently for the TX UE. For example, based on at least one of a priority of a service transmitted by the TX UE, a type of a service transmitted by the TX UE, a QoS requirement (e.g., reliability and/or latency) related to a service transmitted by the TX UE, and/or a cast type, the TX UE may determine whether to restrict the TX parameter based on the relative speed.

For example, based on at least one of a priority of a service transmitted by the TX UE, a type of a service transmitted by the TX UE, a QoS requirement (e.g., reliability and/or latency) related to a service transmitted by the TX UE, and/or a cast type, whether the TX UE restricts the TX parameter without considering absolute speed may be configured differently for the TX UE. For example, based on at least one of a priority of a service transmitted by the TX UE, a type of a service transmitted by the TX UE, a QoS requirement (e.g., reliability and/or latency) related to a service transmitted by the TX UE, and/or a cast type, the TX UE may determine whether to restrict the TX parameter without considering the absolute speed.

For example, based on at least one of a priority of a service transmitted by the TX UE, a type of a service transmitted by the TX UE, a QoS requirement (e.g., reliability and/or latency) related to a service transmitted by the TX UE, and/or a cast type, whether the TX UE restricts the TX parameter without considering relative speed may be configured differently for the TX UE. For example, based on at least one of a priority of a service transmitted by the TX UE, a type of a service transmitted by the TX UE, a QoS requirement (e.g., reliability and/or latency) related to a service transmitted by the TX UE, and/or a cast type, the TX UE may determine whether to restrict the TX parameter without considering the relative speed.

For example, based on at least one of a priority of a service transmitted by the TX UE, a type of a service transmitted by the TX UE, a QoS requirement (e.g., reliability and/or latency) related to a service transmitted by the TX UE, and/or a cast type, whether the TX UE restricts the TX parameter may be configured differently for the TX UE. For example, based on at least one of a priority of a service transmitted by the TX UE, a type of a service transmitted by the TX UE, a QoS requirement (e.g., reliability and/or latency) related to a service transmitted by the TX UE, and/or a cast type, the TX UE may determine whether to restrict the TX parameter.

For example, in the case of a service with a relatively high reliability requirement, the TX parameter restriction based on relative speed may be configured for the TX UE. For example, the TX UE may determine/apply the TX parameter restriction value/range based on the relative speed, and the TX UE may transmit SL information to the RX UE based on the TX parameter restriction value/range.

For example, in the case of a service for which SL HARQ feedback is enabled, the TX parameter restriction based on relative speed may be configured for the TX UE. For example, the TX UE may determine/apply the TX parameter restriction value/range based on the relative speed, and the TX UE may transmit SL information to the RX UE based on the TX parameter restriction value/range.

For example, in the case of a unicast service, the TX parameter restriction based on relative speed may be configured for the TX UE. For example, the unicast service may be a service transmitted by the TX UE to the RX UE through a PC5 RRC connection. For example, the TX UE may determine/apply the TX parameter restriction value/range based on the relative speed, and the TX UE may transmit SL information to the RX UE based on the TX parameter restriction value/range.

For example, in the case of a groupcast service, the TX parameter restriction based on relative speed may be configured for the TX UE. For example, the TX UE may determine/apply the TX parameter restriction value/range based on the relative speed, and the TX UE may transmit SL information to the RX UE based on the TX parameter restriction value/range.

For example, in the case of a service with a relatively high reliability requirement, the TX parameter restriction based on absolute speed may be configured for the TX UE. For example, the TX UE may determine/apply the TX parameter restriction value/range based on the absolute speed, and the TX UE may transmit SL information to the RX UE based on the TX parameter restriction value/range.

For example, in the case of a service for which SL HARQ feedback is enabled, the TX parameter restriction based on absolute speed may be configured for the TX UE. For example, the TX UE may determine/apply the TX parameter restriction value/range based on the absolute speed, and the TX UE may transmit SL information to the RX UE based on the TX parameter restriction value/range.

For example, in the case of a unicast service, the TX parameter restriction based on absolute speed may be configured for the TX UE. For example, the unicast service may be a service transmitted by the TX UE to the RX UE through a PC5 RRC connection. For example, the TX UE may determine/apply the TX parameter restriction value/range based on the absolute speed, and the TX UE may transmit SL information to the RX UE based on the TX parameter restriction value/range.

For example, in the case of a groupcast service, the TX parameter restriction based on absolute speed may be configured for the TX UE. For example, the TX UE may determine/apply the TX parameter restriction value/range based on the absolute speed, and the TX UE may transmit SL information to the RX UE based on the TX parameter restriction value/range.

For example, in the case of a service with a specific priority, if the TX parameter restriction based on absolute speed is not configured for the TX UE, the TX UE may determine/select a TX parameter used for transmission of a message related to the service with the specific priority by using the relative speed. For example, in the case of a service with a specific priority, if the TX parameter restriction based on absolute speed is not configured for the TX UE, the TX UE may determine/select a TX parameter used for transmission of a message related to the service with the specific priority by using the relative speed, according to the capability of the TX UE. For example, the TX parameter may be determined/selected from within a pre-configured candidate parameter set.

For example, in the case of a specific type of a service, if the TX parameter restriction based on absolute speed is not configured for the TX UE, the TX UE may determine/select a TX parameter used for transmission of a message related to the specific type of the service by using the relative speed. For example, in the case of a specific type of a service, if the TX parameter restriction based on absolute speed is not configured for the TX UE, the TX UE may determine/select a TX parameter used for transmission of a message related to the specific type of the service by using the relative speed, according to the capability of the TX UE. For example, the TX parameter may be determined/selected from within a pre-configured candidate parameter set.

For example, in the case of a service with a specific QoS requirement, if the TX parameter restriction based on absolute speed is not configured for the TX UE, the TX UE may determine/select a TX parameter used for transmission of a message related to the service with the specific QoS requirement by using the relative speed. For example, in the case of a service with a specific QoS requirement, if the TX parameter restriction based on absolute speed is not configured for the TX UE, the TX UE may determine/select a TX parameter used for transmission of a message related to the service with the specific QoS requirement by using the relative speed, according to the capability of the TX UE. For example, the TX parameter may be determined/selected from within a pre-configured candidate parameter set.

For example, in the case of a service related to a specific cast type, if the TX parameter restriction based on absolute speed is not configured for the TX UE, the TX UE may determine/select a TX parameter used for transmission of a message related to the service related to the specific cast type by using the relative speed. For example, in the case of a service related to a specific cast type, if the TX parameter restriction based on absolute speed is not configured for the TX UE, the TX UE may determine/select a TX parameter used for transmission of a message related to the service related to the specific cast type by using the relative speed, according to the capability of the TX UE. For example, the TX parameter may be determined/selected from within a pre-configured candidate parameter set.

For example, if the TX UE is configured to restrict the TX parameter without considering absolute speed, the TX UE may determine/select a TX parameter used for transmission of a message by using relative speed. For example, the message may include at least one of the message related to the service with the specific priority, the message related to the specific type of the service, the message related to the service with the specific QoS requirement, and/or the message related to the service of the specific cast type.

For example, if the TX UE is not configured to restrict the TX parameter, the TX UE may determine/select a TX parameter used for transmission of a message by using relative speed. For example, the message may include at least one of the message related to the service with the specific priority, the message related to the specific type of the service, the message related to the service with the specific QoS requirement, and/or the message related to the service of the specific cast type.

For example, in general, based on a cast type (e.g., unicast, groupcast, broadcast) of the TX UE and/or whether SL HARQ feedback is enabled, a priority of a (target) service, a type of the (target) service, and/or a QoS requirement of the (target) service may be different. Therefore, based on the cast type of the TX UE and/or whether SL HARQ feedback is performed/applied for a service transmitted by the TX UE, the TX parameter restriction may be applied/configured/implemented for the TX UE.

Based on an embodiment of the present disclosure, the number of antenna ports (APs) related to a PT-RS (transmitted on a PSSCH) by the TX UE may be less than the number of APs related to a PSSCH. For example, the number of APs used by the TX UE to transmit the PT-RS may be less than the number of APs used by the TX UE to transmit the PSSCH. In the above case, the TX UE may not allocate power to a PT-RS RE on a specific/part (PSSCH) layer/AP. For example, the PT-RS RE may be an RE through which the PT-RS is transmitted. Herein, for example, if the TX UE allocates/distributes Power Spectral Density (PSD) on a zero power PT-RS RE to a data RE located in the form of FDM with the zero power PT-RS RE (within the same symbol), the PSD may be different between a first symbol (e.g., a symbol to which a PT-RS and data is mapped) and a second symbol (e.g., a symbol to which only data is mapped) adjacent to the first symbol. Accordingly, a power transient period may be additionally required. Herein, for example, in order to alleviate the above-mentioned problem, the TX UE may be configured not to allocate/distribute the PSD on the zero-power PT-RS RE to the data RE located in the form of FDM with the zero-power PT-RS RE (within the same symbol). For example, the TX UE may not allocate/distribute the PSD on the zero-power PT-RS RE to the data RE located in the form of FDM with the zero-power PT-RS RE (within the same symbol). For example, the TX UE may determine/interpret that data mapping is virtually performed on the zero-power PT-RS RE, and the TX UE may not allocate/distribute the PSD on the zero-power PT-RS RE to the data RE located in the form of FDM with the zero-power PT-RS RE (within the same symbol).

For example, the UE may determine whether to apply at least one of the rules proposed in various embodiments of the present disclosure, based on whether the UE performs a chain-based resource reservation operation. For example, the UE may determine whether to apply at least one of the rules proposed in various embodiments of the present disclosure, based on whether the UE performs a block-based resource reservation operation. For example, the UE may determine whether to apply at least one of the rules proposed in various embodiments of the present disclosure, based on whether the UE performs a blind retransmission operation. For example, the UE may determine whether to apply at least one of the rules proposed in various embodiments of the present disclosure, based on whether the UE performs a SL HARQ feedback-based retransmission operation. For example, the UE may determine whether to apply at least one of the rules proposed in various embodiments of the present disclosure, based on whether the UE performs a CG-based resource selection/reservation operation. For example, the UE may determine whether to apply at least one of the rules proposed in various embodiments of the present disclosure, based on whether the UE performs a DG-based resource selection/reservation operation.

For example, whether the UE applies at least one of the rules proposed in various embodiments of the present disclosure may be configured differently or limitedly for the UE for each resource pool. For example, whether the UE applies at least one of the rules proposed in various embodiments of the present disclosure may be configured differently or limitedly for the UE for each service type. For example, whether the UE applies at least one of the rules proposed in various embodiments of the present disclosure may be configured differently or limitedly for the UE for each service priority. For example, whether the UE applies at least one of the rules proposed in various embodiments of the present disclosure may be configured differently or limitedly for the UE for each cast type. For example, the cast type may include at least one of unicast, groupcast, and/or broadcast. For example, whether the UE applies at least one of the rules proposed in various embodiments of the present disclosure may be configured differently or limitedly for the UE for each destination UE. For example, whether the UE applies at least one of the rules proposed in various embodiments of the present disclosure may be configured differently or limitedly for the UE for each (L1 or L2) destination ID. For example, whether the UE applies at least one of the rules proposed in various embodiments of the present disclosure may be configured differently or limitedly for the UE for each (L1 or L2) source ID. For example, whether the UE applies at least one of the rules proposed in various embodiments of the present disclosure may be configured differently or limitedly for the UE for each (service) QoS parameter. For example, the (service) QoS parameter may include at least one of a reliability related parameter, a latency related parameter, and/or a (target) block error rate (BLER)

related parameter. For example, whether the UE applies at least one of the rules proposed in various embodiments of the present disclosure may be configured differently or limitedly for the UE for each (resource pool) congestion level. For example, whether the UE applies at least one of the rules proposed in various embodiments of the present disclosure may be configured differently or limitedly for the UE for each SL mode type. For example, the SL mode type may include SL mode 1 and/or SL mode 2. For example, whether the UE applies at least one of the rules proposed in various embodiments of the present disclosure may be configured differently or limitedly for the UE for each grant type. For example, the grant type may include CG and/or DG. For example, whether the UE applies at least one of the rules proposed in various embodiments of the present disclosure may be configured differently or limitedly for the UE for each packet/message (e.g., TB) size. For example, whether the UE applies at least one of the rules proposed in various embodiments of the present disclosure may be configured differently or limitedly for the UE for each number of subchannels used by the UE for PSSCH transmission. For example, whether the UE applies at least one of the rules proposed in various embodiments of the present disclosure may be configured differently or limitedly for the UE for each number of RBs used by the UE for PSCCH transmission. For example, whether the UE applies at least one of the rules proposed in various embodiments of the present disclosure may be configured differently or limitedly for the UE for each number of RBs included in the (one) subchannel. For example, whether the UE applies at least one of the rules proposed in various embodiments of the present disclosure may be configured differently or limitedly for the UE for each number of subchannels included in a resource pool and/or for each number of RBs included in the resource pool. For example, whether the UE applies at least one of the rules proposed in various embodiments of the present disclosure may be configured differently or limitedly, based on whether the (one) subchannel size and the PSCCH (frequency) resource size are the same. For example, whether the UE applies at least one of the rules proposed in various embodiments of the present disclosure may be configured differently or limitedly, based on whether a (semi) static codebook is configured for the UE.

For example, the parameters may be configured differently or limitedly for the UE, based on whether the UE performs a chain-based resource reservation operation. For example, the parameters may be configured differently or limitedly for the UE, based on whether the UE performs a block-based resource reservation operation. For example, the parameters may be configured differently or limitedly for the UE, based on whether the UE performs a blind retransmission operation. For example, the parameters may be configured differently or limitedly for the UE, based on whether the UE performs a SL HARQ feedback-based retransmission operation. For example, the parameters may be configured differently or limitedly for the UE, based on whether the UE performs a CG-based resource selection/reservation operation. For example, the parameters may be configured differently or limitedly for the UE, based on whether the UE performs a DG-based resource selection/reservation operation.

For example, the parameters may be configured differently or limitedly for the UE for each resource pool. For example, the parameters may be configured differently or limitedly for the UE for each service type. For example, the parameters may be configured differently or limitedly for the UE for each service priority. For example, the parameters may be configured differently or limitedly for the UE for each cast type. For example, the cast type may include at least one of unicast, groupcast, and/or broadcast. For example, the parameters may be configured differently or limitedly for the UE for each destination UE. For example, the parameters may be configured differently or limitedly for the UE for each (L1 or L2) destination ID. For example, the parameters may be configured differently or limitedly for the UE for each (L1 or L2) source ID. For example, the parameters may be configured differently or limitedly for the UE for each (service) QoS parameter. For example, the (service) QoS parameter may include at least one of a reliability-related parameter, a latency-related parameter, and/or a (target) BLER-related parameter. For example, the parameters may be configured differently or limitedly for the UE for each (resource pool) congestion level. For example, the parameters may be configured differently or limitedly for the UE for each SL mode type. For example, the SL mode type may include SL mode 1 and/or SL mode 2. For example, the parameters may be configured differently or limitedly for the UE for each grant type. For example, the grant type may include CG and/or DG. For example, the parameters may be configured differently or limitedly for the UE for each packet/message (e.g., TB) size. For example, the parameters may be configured differently or limitedly for the UE for each number of subchannels used by the UE for PSSCH transmission. For example, the parameters may be configured differently or limitedly for the UE for each number of RBs used by the UE for PSCCH transmission. For example, the parameters may be configured differently or limitedly for the UE for each number of RBs included in the (one) subchannel. For example, the parameters may be configured differently or limitedly for the UE for each number of subchannels included in a resource pool and/or for each number of RBs included in the resource pool. For example, the parameters may be configured differently or limitedly, based on whether the size of the (one) subchannel and the size of the PSCCH (frequency) resource are the same. For example, the parameters may be configured differently or limitedly, based on whether a (semi) static codebook is configured for the UE.

Figure 16:
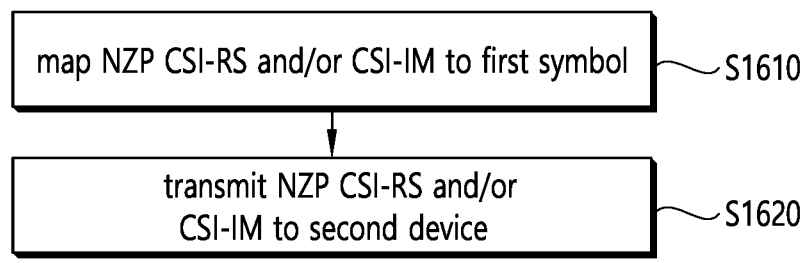
FIG. 16 shows a method for a first device to transmit an NZP CSI-RS and/or a CSI-IM, based on an embodiment of the present disclosure.

FIG. 16 shows a method for a first device to transmit an NZP CSI-RS and/or a CSI-IM, based on an embodiment of the present disclosure. The embodiment of FIG. 16 may be combined with various embodiments of the present disclosure.

Referring to FIG. 16, in step S1610, the first device may map the NZP CSI-RS and/or the CSI-IM to a first symbol. For example, the first device may map the NZP CSI-RS and/or the CSI-IM to the first symbol based on various embodiments of the present disclosure. For example, the first device may determine whether to map at least one of data information, a $2^{nd}$ SCI, and/or a PT-RS to an RE located in the form of FDM with the first symbol to which the NZP CSI-RS and/or the CSI-IM is mapped. For example, the first device may determine whether to map at least one of data information, a $2^{nd}$ SCI, and/or a PT-RS to an RE located in the form of FDM with the first symbol to which the NZP CSI-RS and/or the CSI-IM is mapped, based on various embodiments of the present disclosure. In step S1620, the first device may transmit the NZP CSI-RS and/or the CSI-IM to the second device. For example, the first device may transmit the NZP CSI-RS and/or the CSI-IM to the second device based on various embodiments of the present disclosure.

Figure 17:
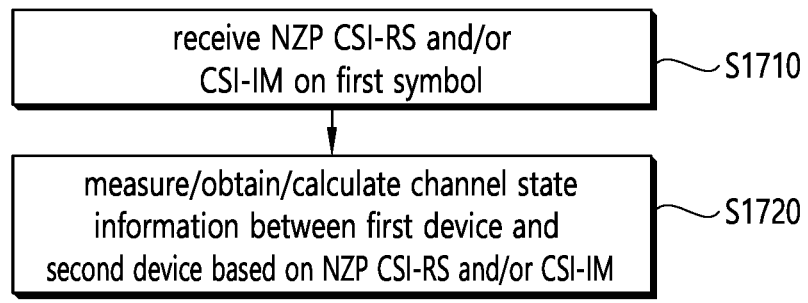
FIG. 17 shows a method for a second device to obtain channel state information based on an NZP CSI-RS and/or a CSI-IM, based on an embodiment of the present disclosure.

FIG. 17 shows a method for a second device to obtain channel state information based on an NZP CSI-RS and/or a CSI-IM, based on an embodiment of the present disclosure. The embodiment of FIG. 17 may be combined with various embodiments of the present disclosure.

Referring to FIG. 17, in step S1710, the second device may receive the NZP CSI-RS and/or the CSI-IM on a first symbol. For example, the NZP CSI-RS and/or the CSI-IM may be mapped on the first symbol. For example, based on various embodiments of the present disclosure, the NZP CSI-RS and/or the CSI-IM may be mapped on the first symbol by the first device. For example, the first device may determine whether to map at least one of data information, a $2^{nd}$ SCI, and/or a PT-RS to an RE located in the form of FDM with the first symbol to which the NZP CSI-RS and/or the CSI-IM is mapped. For example, the first device may determine whether to map at least one of data information, a $2^{nd}$ SCI, and/or a PT-RS to an RE located in the form of FDM with the first symbol to which the NZP CSI-RS and/or the CSI-IM is mapped, based on various embodiments of the present disclosure. In step S1720, the second device may measure/obtain/calculate channel state information between the first device and the second device based on the NZP CSI-RS and/or the CSI-IM. Additionally, the second device may transmit the channel state information to the first device.

Figure 18:
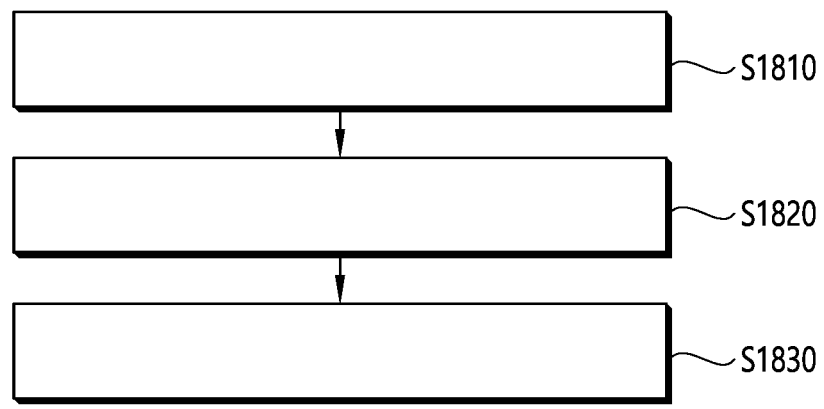
FIG. 18 shows a method for a first device to perform wireless communication, based on an embodiment of the present disclosure.

FIG. 18 shows a method for a first device to perform wireless communication, based on an embodiment of the present disclosure. The embodiment of FIG. 18 may be combined with various embodiments of the present disclosure.

Referring to FIG. 18, in step S1810, the first device may measure, in a first slot, a channel busy ratio (CBR) for a resource pool. In step S1820, the first device may determine power for physical sidelink shared channel (PSSCH) transmission in a second slot, based on the CBR measured in the first slot. In step S1830, the first device may perform, to a second device, the PSSCH transmission in the second slot based on the power. For example, the first slot may be a slot before N slots from the second slot, and the N may be determined based on subcarrier spacing (SCS) related to the PSSCH transmission, and the N may be a positive integer.

For example, the larger the SCS related to the PSSCH transmission, the larger the N may be determined. For example, the SCS may be one of 15 kHz, 30 kHz, 60 kHz or 120 kHz.

For example, an index of the first slot may be a value obtained by subtracting the N from an index of the second slot.

For example, the CBR may be measured for the resource pool for a time interval including a plurality of slots before the first slot. For example, the CBR may be measured for the resource pool for the time interval from (i) a third slot before 100 slots from the first slot to (ii) a fourth slot before 1 slot from the first slot. For example, the CBR may be measured for the resource pool for the time interval from (i) 100 ms before the first slot to (ii) 1 ms before the first slot.

For example, maximum transmit power related to the PSSCH transmission may be configured for the first device for each range of the CBR.

For example, a size of a precoding resource block group (PRG) related to the PSSCH transmission may be configured for the first device. For example, the size of the PRG may be applied based on a resource block (RB) regardless of a sub-channel. For example, a same precoding may be applied to consecutively allocated RBs included in the PRG.

Additionally, for example, the first device may transmit, to the second device, information related to a sensing type of the first device. For example, the sensing type may include partial sensing or full sensing.

Additionally, for example, the first device may transmit, to the second device, information related to a resource allocation mode of the first device.

The proposed method can be applied to the device(s) based on various embodiments of the present disclosure. First, the processor 102 of the first device 100 may measure, in a first slot, a channel busy ratio (CBR) for a resource pool. In addition, the processor 102 of the first device 100 may determine power for physical sidelink shared channel (PSSCH) transmission in a second slot, based on the CBR measured in the first slot. In addition, the processor 102 of the first device 100 may control the transceiver 106 to perform, to a second device, the PSSCH transmission in the second slot based on the power. For example, the first slot may be a slot before N slots from the second slot, and the N may be determined based on subcarrier spacing (SCS) related to the PSSCH transmission, and the N may be a positive integer.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: measure, in a first slot, a channel busy ratio (CBR) for a resource pool; determine power for physical sidelink shared channel (PSSCH) transmission in a second slot, based on the CBR measured in the first slot; and perform, to a second device, the PSSCH transmission in the second slot based on the power. For example, the first slot may be a slot before N slots from the second slot, and the N may be determined based on subcarrier spacing (SCS) related to the PSSCH transmission, and the N may be a positive integer.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: measure, in a first slot, a channel busy ratio (CBR) for a resource pool; determine power for physical sidelink shared channel (PSSCH) transmission in a second slot, based on the CBR measured in the first slot; and perform, to a second UE, the PSSCH transmission in the second slot based on the power. For example, the first slot may be a slot before N slots from the second slot, and the N may be determined based on subcarrier spacing (SCS) related to the PSSCH transmission, and the N may be a positive integer.

Based on an embodiment of the present disclosure, a non-transitory computer-readable storage medium storing instructions may be provided. For example, the instructions, when executed, may cause a first device to: measure, in a first slot, a channel busy ratio (CBR) for a resource pool; determine power for physical sidelink shared channel (PSSCH) transmission in a second slot, based on the CBR measured in the first slot; and perform, to a second device, the PSSCH transmission in the second slot based on the power. For example, the first slot may be a slot before N slots from the second slot, and the N may be determined based on subcarrier spacing (SCS) related to the PSSCH transmission, and the N may be a positive integer.

Figure 19:
FIG. 19 shows a method for a second device to perform wireless communication, based on an embodiment of the present disclosure.

FIG. 19 shows a method for a second device to perform wireless communication, based on an embodiment of the present disclosure. The embodiment of FIG. 19 may be combined with various embodiments of the present disclosure.

Referring to FIG. 19, in step S1910, the second device may receive, from a first device, a physical sidelink shared channel (PSSCH) in a second slot. For example, transmit power related to the PSSCH may be determined by the first device based on a channel busy ratio (CBR) measured for a resource pool in a first slot, and the first slot may be a slot before N slots from the second slot, and the N may be determined based on subcarrier spacing (SCS) related to the PSSCH, and the N may be a positive integer.

The proposed method can be applied to the device(s) based on various embodiments of the present disclosure. First, the processor 202 of the second device 200 may control the transceiver 206 to receive, from a first device, a physical sidelink shared channel (PSSCH) in a second slot. For example, transmit power related to the PSSCH may be determined by the first device based on a channel busy ratio (CBR) measured for a resource pool in a first slot, and the first slot may be a slot before N slots from the second slot, and the N may be determined based on subcarrier spacing (SCS) related to the PSSCH, and the N may be a positive integer.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a physical sidelink shared channel (PSSCH) in a second slot. For example, transmit power related to the PSSCH may be determined by the first device based on a channel busy ratio (CBR) measured for a resource pool in a first slot, and the first slot may be a slot before N slots from the second slot, and the N may be determined based on subcarrier spacing (SCS) related to the PSSCH, and the N may be a positive integer.

Based on an embodiment of the present disclosure, an apparatus configured to control a second user equipment (UE) may be provided. For example, the apparatus may comprise: one or more processors; and one or more memories operably connected to the one or more processors and storing instructions. For example, the one or more processors may execute the instructions to: receive, from a first UE, a physical sidelink shared channel (PSSCH) in a second slot. For example, transmit power related to the PSSCH may be determined by the first device based on a channel busy ratio (CBR) measured for a resource pool in a first slot, and the first slot may be a slot before N slots from the second slot, and the N may be determined based on subcarrier spacing (SCS) related to the PSSCH, and the N may be a positive integer.

Based on an embodiment of the present disclosure, a non-transitory computer-readable storage medium storing instructions may be provided. For example, the instructions, when executed, may cause a second device to: receive, from a first device, a physical sidelink shared channel (PSSCH) in a second slot. For example, transmit power related to the PSSCH may be determined by the first device based on a channel busy ratio (CBR) measured for a resource pool in a first slot, and the first slot may be a slot before N slots from the second slot, and the N may be determined based on subcarrier spacing (SCS) related to the PSSCH, and the N may be a positive integer.

Based on various embodiments of the present disclosure, if the TX UE performs SL transmission in slot #N, a CBR value used for the related congestion control (e.g., maximum allowable transmit power value) may be a value measured at slot #(N-X) by the TX UE. Herein, the X value may be configured differently based on the SL SCS value. For example, as the SCS value increases, the X value may be set as a relatively large value.

Based on various embodiments of the present disclosure, the unit of the PSSCH-related PRG may be configured to the total number of RBs constituting the transmitted PSSCH (i.e., the total number of subchannels).

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
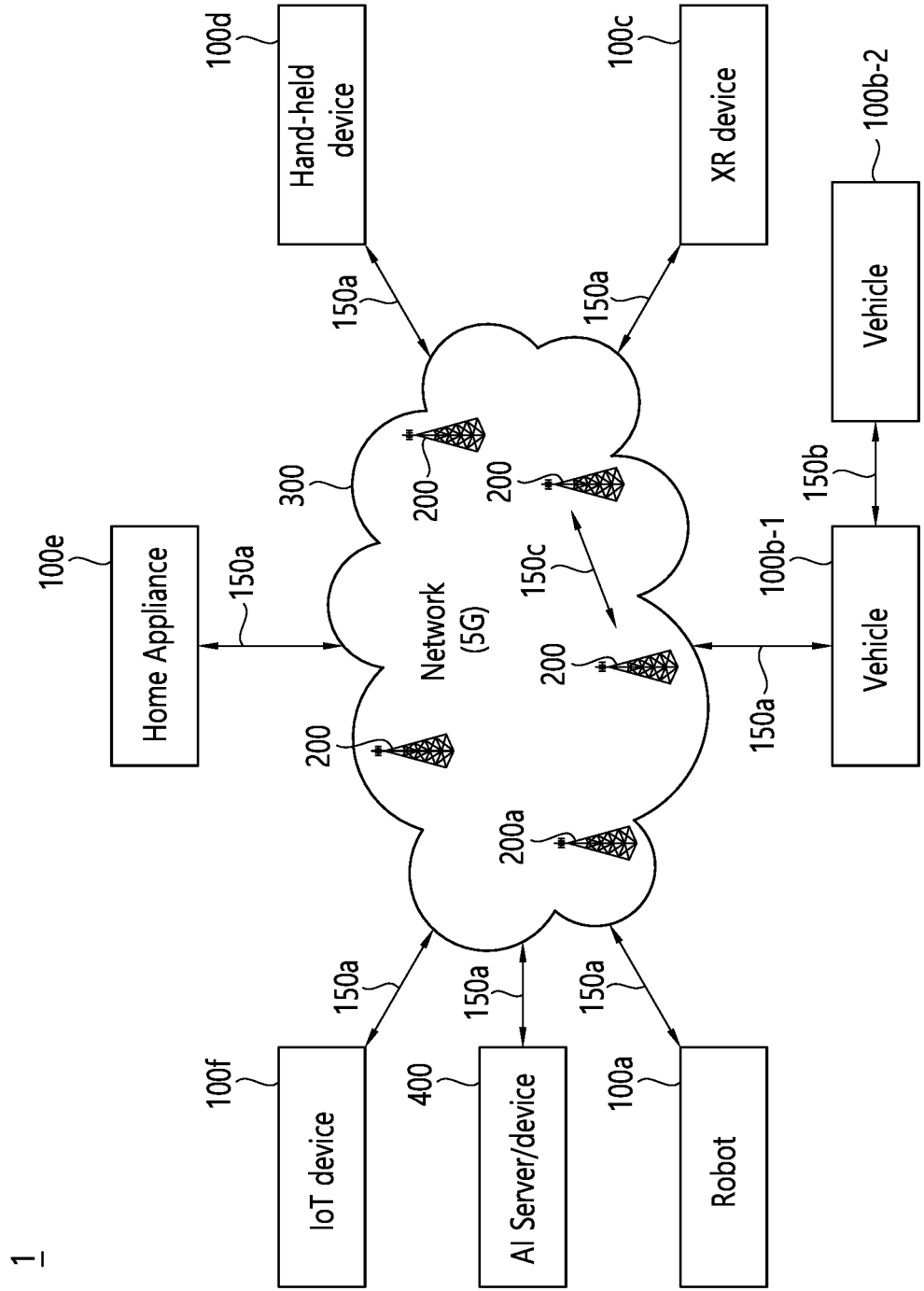
FIG. 20 shows a communication system 1, based on an embodiment of the present disclosure.

FIG. 20 shows a communication system 1, based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
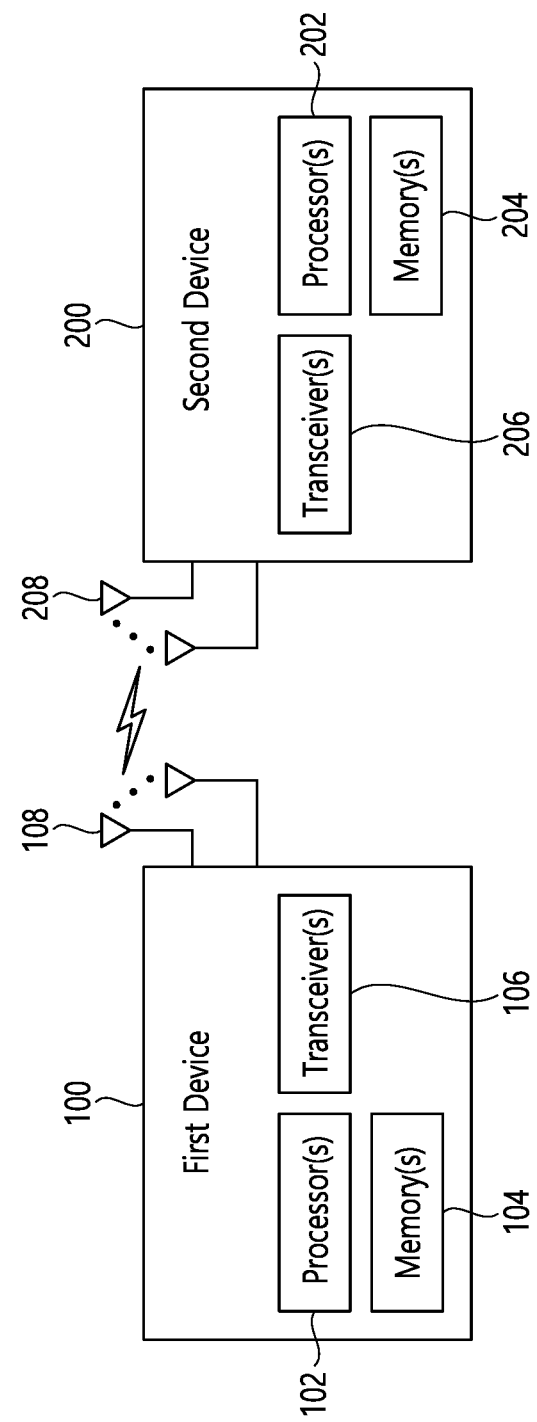
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
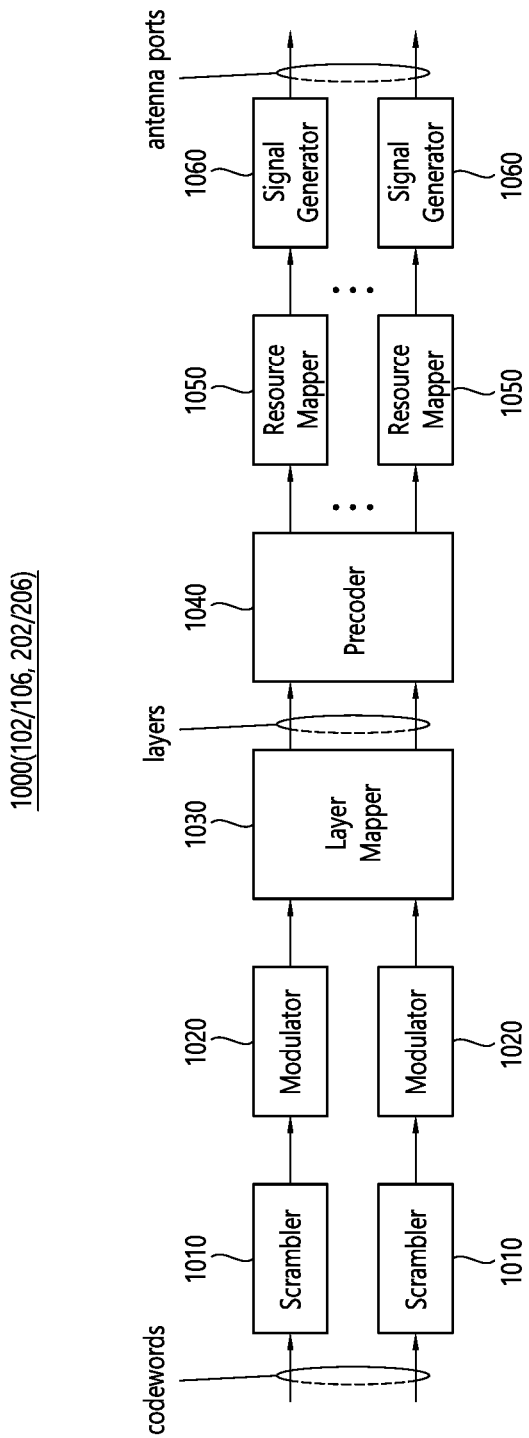
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
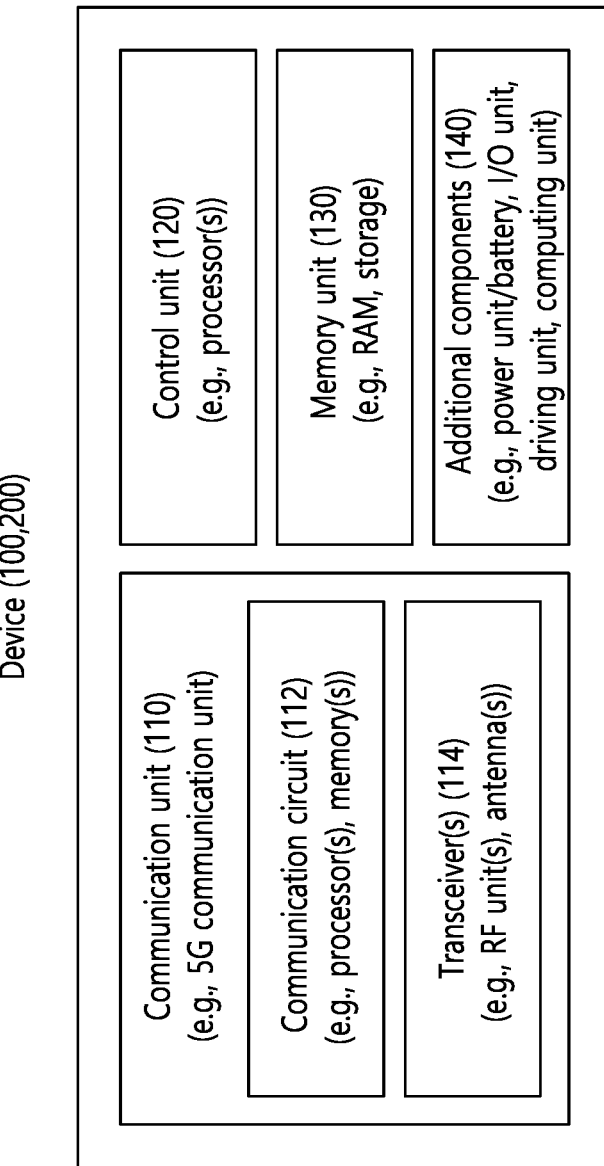
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
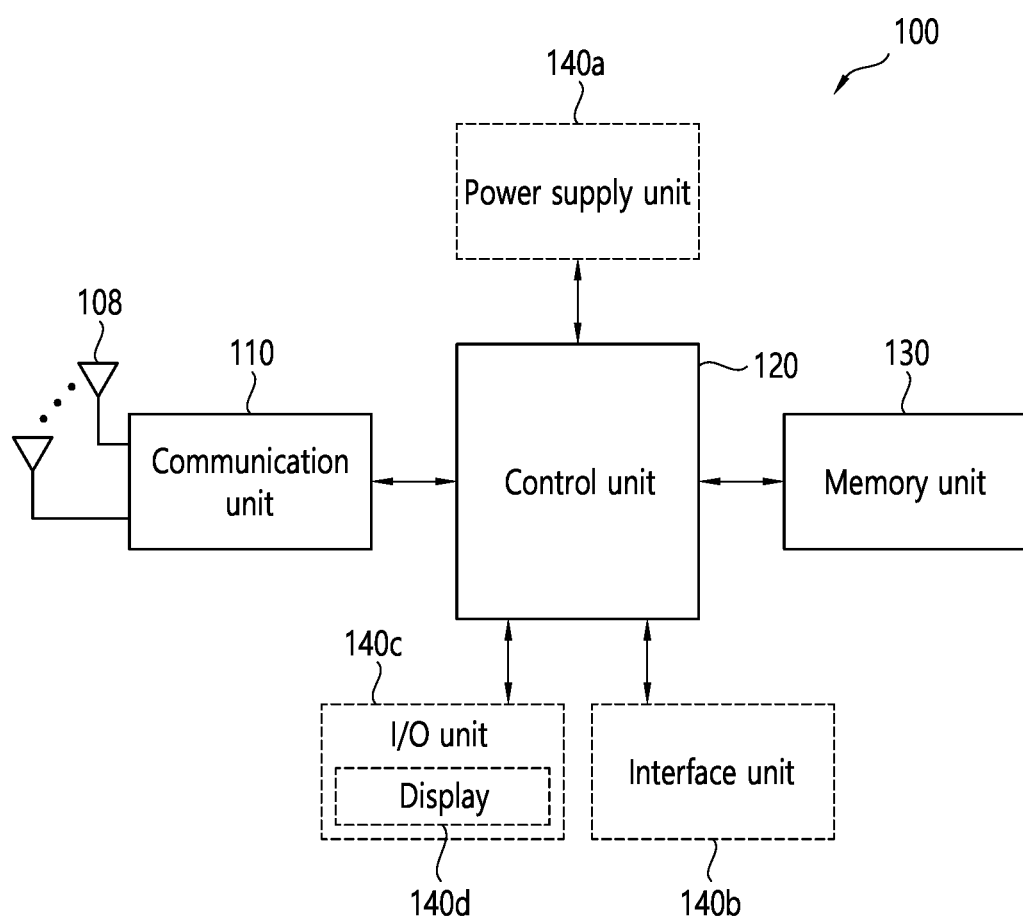
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
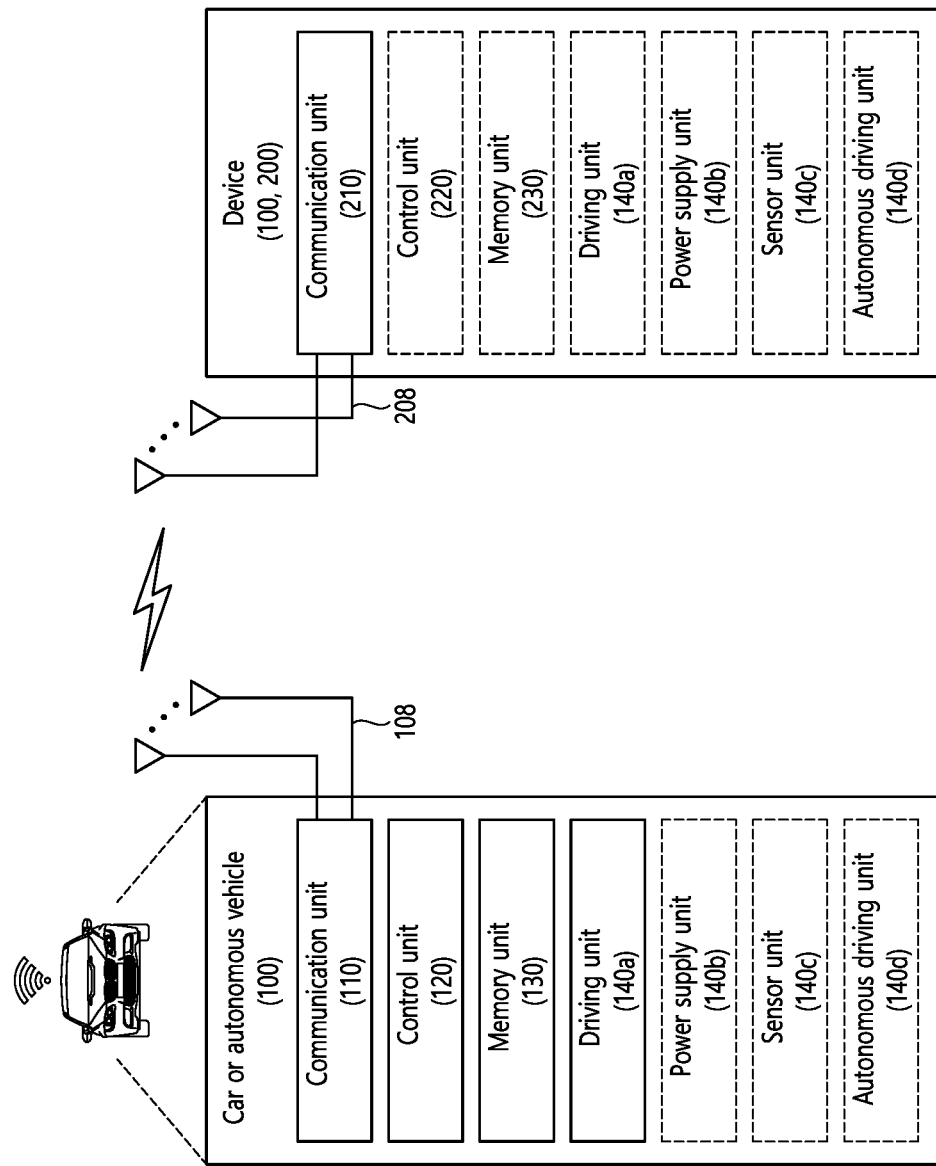
FIG. 25 shows a vehicle or an autonomous vehicle, based on an embodiment of the present disclosure.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method by a first device, the method comprising:
measuring, in a first slot, a channel busy ratio (CBR), which is a portion of sub-channels, in a resource pool whose received signal strength indicator, RSSI, exceeds a threshold RSSI;
determining power for physical sidelink shared channel (PSSCH) transmission in a second slot, based on the CBR measured in the first slot; and
performing, to a second device, the PSSCH transmission in the second slot based on the power,
wherein the first slot is a slot before congestion control processing time from the second slot,
wherein a number of slots regarding the congestion control processing time is based on subcarrier spacing (SCS) of sidelink channel with which the PSSCH is to be transmitted.

2. The method of claim 1, wherein the larger the SCS related to the PSSCH transmission, the larger the number of slots is.

3. The method of claim 2, wherein the SCS is one of 15 kHz, 30 kHz, 60 kHz or 120 kHz.

4. The method of claim 1, wherein an index of the first slot is a value obtained by subtracting the number of slots from an index of the second slot.

5. The method of claim 1, wherein the RSSI is measured for the resource pool for a time interval including a plurality of slots before the first slot.

6. The method of claim 5, wherein the RSSI is measured for the resource pool for the time interval from (i) a third slot before 100 slots from the first slot to (ii) a fourth slot before 1 slot from the first slot.

7. The method of claim 5, wherein the RSSI is measured for the resource pool for the time interval from (i) 100 ms before the first slot to (ii) 1 ms before the first slot.

8. The method of claim 1, wherein maximum transmit power related to the PSSCH transmission is configured for the first device for each range of the CBR.

9. The method of claim 1, wherein a size of a precoding resource block group (PRG) related to the PSSCH transmission is configured for the first device.

10. The method of claim 9, wherein the size of the PRG is applied based on a resource block (RB) regardless of a sub-channel.

11. The method of claim 10, wherein a same precoding is applied to consecutively allocated RBs included in the PRG.

12. The method of claim 1, further comprising:
transmitting, to the second device, information related to a sensing type of the first device,
wherein the sensing type includes partial sensing or full sensing.

13. The method of claim 1, further comprising:
transmitting, to the second device, information related to a resource allocation mode of the first device.

14. A first device comprising:
one or more processors;
one or more transceivers; and
one or more memories connected to the one or more processors and the one or more transceivers and storing instructions to perform operations comprising:
measuring, in a first slot, a channel busy ratio (CBR), which is a portion of sub-channels, in a resource pool whose received signal strength indicator, RSSI, exceeds a threshold RSSI;
determining power for physical sidelink shared channel (PSSCH) transmission in a second slot, based on the CBR measured in the first slot; and
performing, to a second device, the PSSCH transmission in the second slot based on the power,
wherein the first slot is a slot before congestion control processing time from the second slot,
wherein a number of slots regarding the congestion control processing time is based on subcarrier spacing (SCS) of sidelink channel with which the PSSCH is to be transmitted.

15. The first device of claim 14, wherein the larger the SCS related to the PSSCH transmission, the larger the number of slots is.

16. The first device of claim 15, wherein the SCS is one of 15 kHz, 30 kHz, 60 kHz or 120 kHz.

17. The first device of claim 14, wherein an index of the first slot is a value obtained by subtracting the number of slots from an index of the second slot.

18. The first device of claim 14, wherein the RSSI is measured for the resource pool for a time interval including a plurality of slots before the first slot.

19. The first device of claim 18, wherein the RSSI is measured for the resource pool for the time interval from (i) a third slot before 100 slots from the first slot to (ii) a fourth slot before 1 slot from the first slot.

20. A processing apparatus adapted to control a first device, the apparatus comprising:
one or more processors; and
one or more memories operably connected to the one or more processors and storing instructions to perform operations comprising:
measuring, in a first slot, a channel busy ratio (CBR), which is a portion of sub-channels, in a resource pool whose received signal strength indicator, RSSI, exceeds a threshold RSSI;
determining power for physical sidelink shared channel (PSSCH) transmission in a second slot, based on the CBR measured in the first slot; and
performing, to a second device, the PSSCH transmission in the second slot based on the power,
wherein the first slot is a slot before congestion control processing time from the second slot,
wherein a number of slots regarding the congestion control processing time is based on subcarrier spacing (SCS) of sidelink channel with which the PSSCH is to be transmitted.

* * * * *